Aug. 11, 1936.  R. C. RUSSELL  2,050,766
VALVE OPERATING MECHANISM
Filed May 18, 1932   6 Sheets-Sheet 2
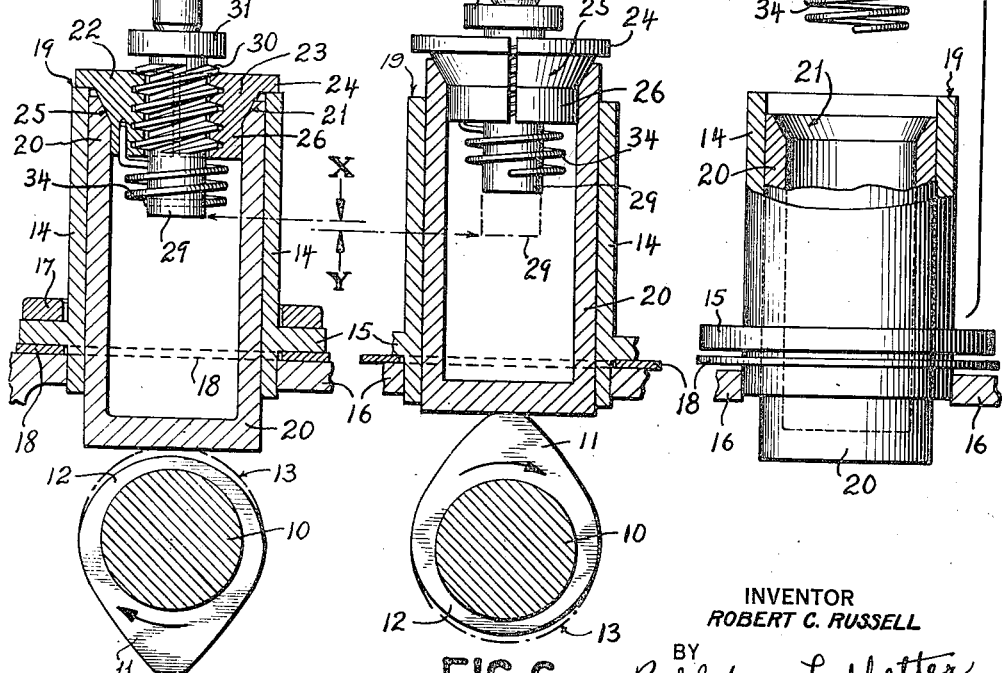
INVENTOR
ROBERT C. RUSSELL
BY
Bohleber + Ledbetter
ATTORNEYS Aug. 11, 1936.                R. C. RUSSELL                2,050,766
                          VALVE OPERATING MECHANISM
                            Filed May 18, 1932            6 Sheets-Sheet 3
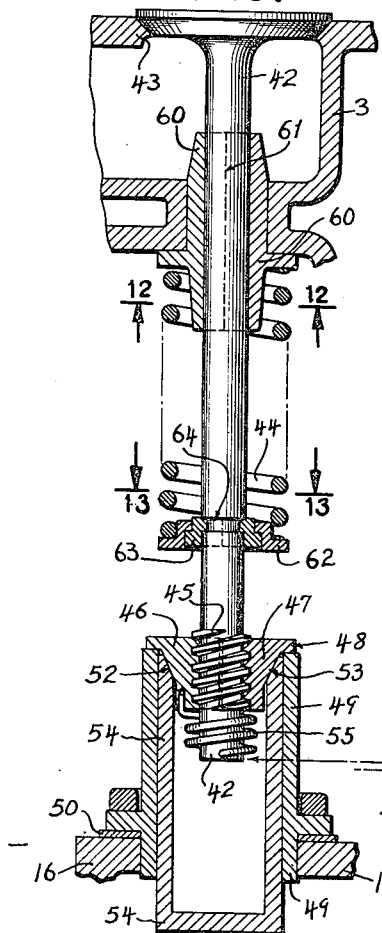
FIG.9.
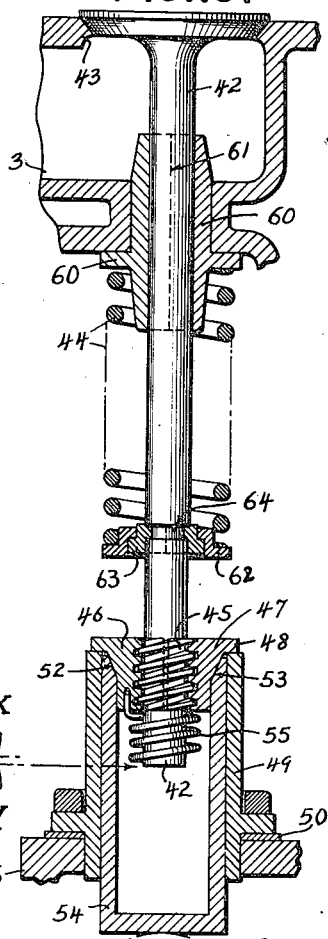
FIG.10.
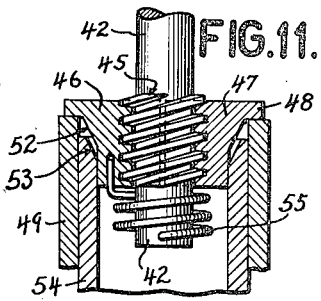
FIG.11.
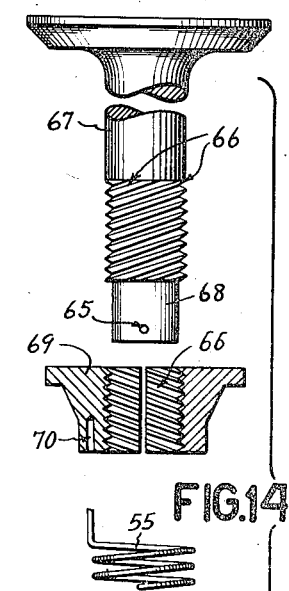
FIG.14.
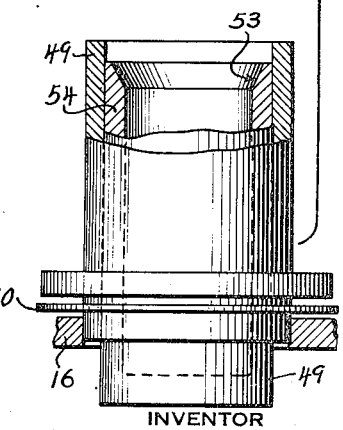
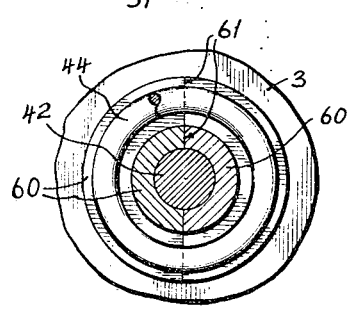
FIG.12.
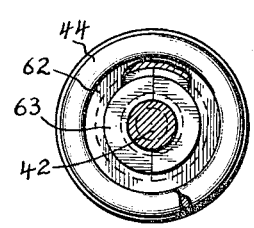
FIG.13.
INVENTOR
*ROBERT C. RUSSELL*
BY
*Bohleber + Ledbetter*
ATTORNEYS Aug. 11, 1936.  R. C. RUSSELL  2,050,766
VALVE OPERATING MECHANISM
Filed May 18, 1932  6 Sheets-Sheet 4

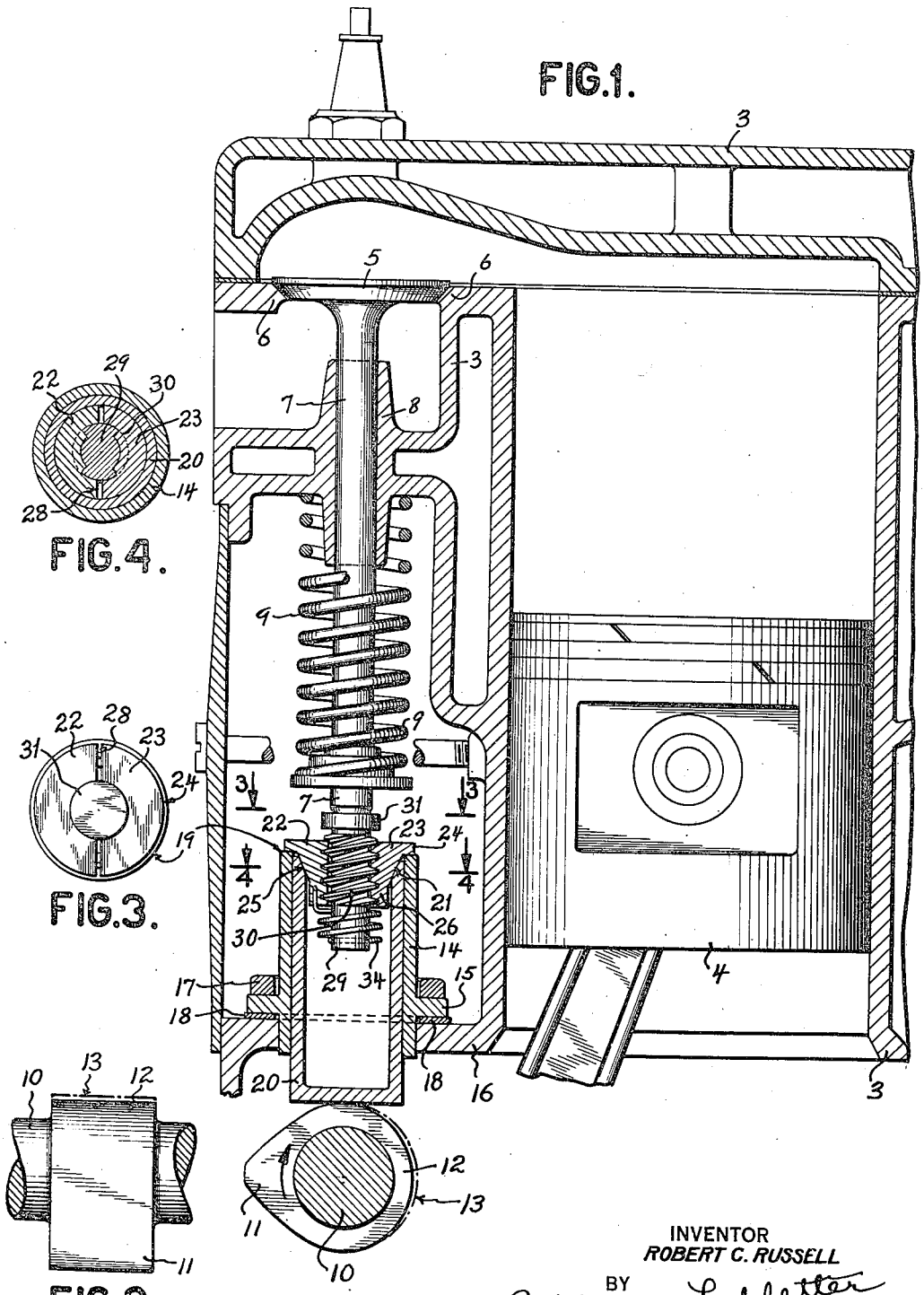

INVENTOR
ROBERT C. RUSSELL
BY
Bohleber + Ledbetter
ATTORNEYS

Aug. 11, 1936.  R. C. RUSSELL  2,050,766
VALVE OPERATING MECHANISM
Filed May 18, 1932  6 Sheets-Sheet 5

INVENTOR
ROBERT C. RUSSELL
BY Bohleber + Ledbetter
ATTORNEYS

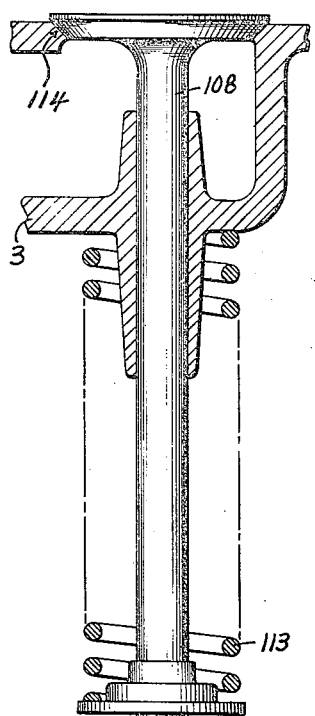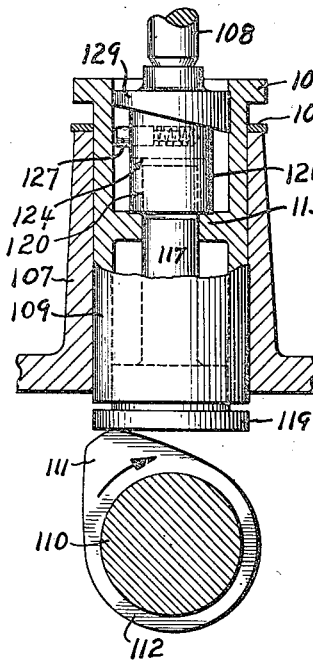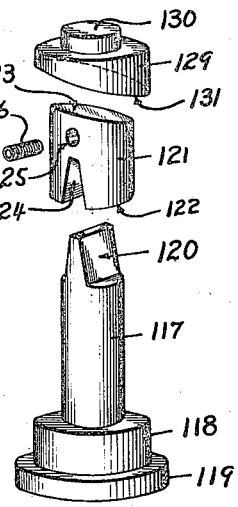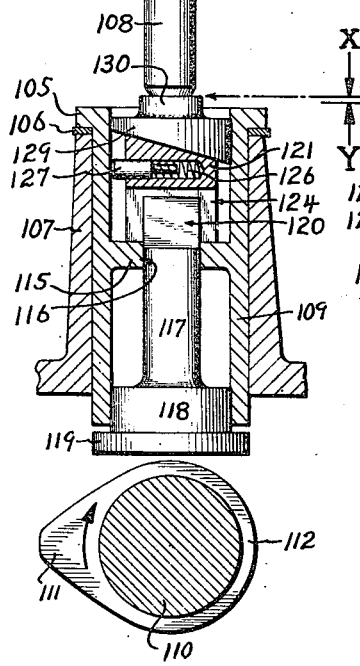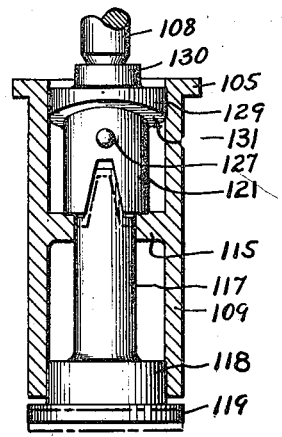

Patented Aug. 11, 1936

2,050,766

UNITED STATES PATENT OFFICE 2,050,766

VALVE OPERATING MECHANISM

Robert C. Russell, Dallas, Tex.

Application May 18, 1932, Serial No. 612,016

42 Claims. (Cl. 123—90)

This invention relates to valve operating mechanism and more particularly to automatic or self adjusting silent valve lifters or tappets for use primarily in connection with internal combustion motors.

A general purpose of the invention is to produce novel self adjusting or compensating valve lifters, also known as valve tappets, for operating and more particularly for lifting or opening valves in relation to their seats as used generally in machinery, engines and the like. This valve lifter automatically maintains a no-clearance operating relationship generally between all parts of the mechanism intermediate the engine or machine driven cam and the valve seat in the cylinder and especially between the cam and valve lifter. This promotes operating efficiency and performance, improves valve timing, avoids wear and hammering of the valve seats and eliminates noise and vibration. The necessity for a solution of these problems is pronounced, especially in present day high speed internal combustion motors which depend on precise and uniform valve timing for maximum efficiency. In aviation engines, which employ even greater valve operating clearance than in automobile engines, the solution of the problem and a correction for the considerable valve operating clearance is of outstanding importance and a measure which will increase engine power, avoid valve trouble, and promote safety.

The invention, therefore, seeks to produce practical commercial forms of silent, automatic, self adjusting valve lifters or tappets which are not subjected to wear in the performance of their automatic compensating function, and which can be produced sufficiently economically to justify their use in the general rank and file of engines of all grades, makes and horse power.

In keeping with these purposes, it is of course an object of this invention to produce novel valve lifters capable of inherent automatic self adjustment or take up in the length of parts for compensation in both directions, i. e., for contraction and expansion of the valve stem and associated members, occasioned by temperature variation, as well as for wear of said parts.

A further object is to produce silent and self adjusting valve lifters or tappets of a solely novel mechanical type which function without the necessity of an oil cushion or other liquid supply and hence the invention is distinguished in this respect from the class of hydraulic or oil lift forms of tappets known to the art. Lubrication, as such, may be an aid to smoothness in operation of the compensating parts of my mechanical tappets but oil is not employed as a medium for lifting or opening the engine valve or for transmitting motion from one part to another.

An important object is to produce automatic and self adjusting valve tappets or lifters, the compensating unit per se or the actuating elements of which, in fact, do not move or actuate in relation to each other, except only when and during an actual change in operating conditions occur, such as variations in temperature with accompanying change in the length of the valve stem or associated parts, whereupon the compensating unit instantly responds and self adjustment is automatically enforced by reason of such change. My valve lifters are distinguished in this particular by reason of their characteristic function to remain inert and rigid, with complete absence of any relative movement between the sensitive compensating parts, until a change in length condition merits or necessitates such compensation. Only then does operative movement of and between the responsive self adjusting parts actually take place. It follows therefore, that minimum friction and wear occurs which makes for long life of the valve lifter.

An outstanding object, in the several forms of construction, is to effectively deal with the problem I have discovered as regards the difficulty of and necessity for positively controlling the automatic movement of the self adjusting or compensating unit, and more particularly, the responsive element or compensator thereof. To illustrate this and other features, there are shown several examples of self adjusting units and responsive elements therefor, to-wit,—a screw means, an inclined spiral plane with a load carrying pin, and also a wedge means. Various forms of clutch means cooperate with the responsive elements to exercise a positive control thereof. By presenting a number of forms of construction, the comprehensiveness of my invention is more fully realized. As to the screw type responsive device, this invention solves the problem by positively preventing its rotation during normal engine operation when, manifestly, no need for compensation exists. As to the inclined spiral plane, likewise, the movement of the load carrying pin is also controlled. And as to the wedge means responsive element, its compensating movement is also positively restricted to that instant or cycle when self adjustment is needed by reason of the existence of an actual variation in valve stem length or of other parts.

It is also significant that the clutch means exercises the above mentioned precise control over the self adjusting unit or its responsive compensator, in the several forms of construction, without appreciable movement of said clutch means, except when a change in length condition necessitates self adjustment and even then the clutch movement is barely perceptible and of short duration. Hence again is stated the important feature of little or no wear of parts because of substantial elimination of internal relative movement within the valve lifter.

The precise and finely gaged control is accomplished, say to counteract or compensate for valve stem elongation, by a direct and instantaneous transfer of the load of the engine valve spring from one member of the tappet to another member thereof, but this action follows only when and for the duration of such valve stem elongation. One who is acquainted with the problem, therefore, appreciates that the compensating movement or creeping of parts in my valve lifters is, indeed, rare in occurrence as compared to the countless times a valve seats and the engine cam rotates. A valve stem does not change its length for each turn of an engine or revolution of its cam. Accordingly, I have made definite improvements in this respect by employing a new principle so to positively avoid undue internal operation and friction of the self adjusting parts.

It is a further object to produce one or more clutches, auxiliary to the self adjusting unit and as a control therefor, which engage and disengage by reason of the load transfer function heretofore mentioned, doing so without perceptible motion of parts. In other words, the clutch or clutches engage by direct application of pressure applied to clutch faces already in contact. The clutch disengages by relief of pressure and the clutching faces do not perceptibly separate. Hence there exists no rotary or reciprocatory effort in the control clutch to cause wear even in long use.

It is a further object to provide a number of examples of load receiving means, as a part of the tappet structure, to pick up the valve spring load imposed by valve stem expansion, and thereupon unclutch the self adjusting mechanism to free it for automatic contraction within a necessarily shortened longitudinal space. This object is effected thru a cooperating bearing guide and the tappet sleeve, in one form of the invention, which takes over the burden of the valve spring load instantly it manifests itself by reason of such expansion. The same object is effected in another form of the invention by a novel cam means having a combined load receiving and clutch releasing heel. In both cases the clutch frees the compensator in the self adjusting unit so that the spring loaded valve of the engine enforces contraction of the tappet precisely proportioned to valve stem elongation. These functions and conditions so gradually act and react, appear and check out, that normal operation of an engine running at normal temperature simply means that the compensating parts in the valve lifter are inert, non-yielding and in a state of rest the greater portion of time during engine operation.

A further important object is to produce automatic self adjusting tappets which do not ride the valve operating cam with load or pressure except on the lift or lobe of the cam, and this also makes for long life of parts by reducing heating effects, friction and wear.

Likewise, an additional object is to produce a valve lifter having novel clutch means, as a control for the compensating or self adjusting unit, which clutch attains a positively rigid non-yielding condition, for thrust against the valve and its closing spring, beginning at a time just prior to the time when the valve leaves its seat and continuing for a short time just after the valve returns to its seat, characterized by relaxation for the remainder of the time the valve is on its seat, whereby automatic compensation may take place only during said remainder of the time said valve is on its seat. Thus is stated the function of preferred forms of the invention particularly attained by the use of my novel cam means which cooperates with the one or more species of inherently automatic self adjusting tappets to effect a novel mode of operation for this new combination of valve actuating mechanism. A perfect no-clearance non-yielding engagement for all parts is the result, especially between the engine valve and the tappet itself.

Although a standard cam, i. e., one having a concentric heel or base circle, may be used for operating the valve lifters herein disclosed, an object is nevertheless to produce novel cams as well as automatic tappets, and which are also new in their combination. The cam means are modified for improved performance in two respects. In the first place, I form the dwell or heel of my preferred cam with a slight drop therein to relive it and thus impart a slight eccentricity opposite the cam lobe. This cam eccentricity relaxes and rests the valve lifter for automatic compensation during the greater portion of that period the valve is on its seat, and also prevents pressure engagement between the valve lifter and heel of the cam. In the second place, the bottom of the lobe or lifting face or faces of the cam, which are about tangent to the base circle of said cam, and sometimes called the foot or approach, may be removed, relieved or designed to afford a quicker valve opening and closing action. The latter performance is now capable of being attained in this invention by eliminating that arc portion or foot of the cam contour which has heretofore been used to gradually and slowly take up, without slap and impact of parts, the several thousandths of an inch expansion clearance heretofore left in the valve mechanism. Hence my cam represents an advance on standard practice and may now be used to quietly open wide the valve in less time than heretofore, hold the valve open for a longer period, and fully close the valve much quicker than is practical with standard non-compensating tappets of present day use.

A further purpose, among others, is to produce several forms of self adjusting valve lifters per se as well as alternate forms of general combinations, and to this end there is illustrated a number of species of cam and tappet constructions by which to more fully adapt the invention to the variety of requirements of the numerous types of internal combustion engines.

The principles of the invention are set forth in the accompanying drawings showing a variety of concrete embodiments by which to illustrate the different forms of the self adjusting means, the compensator element thereof, the control clutch or clutches, and the cam means, together with valve adaptations, in combination, as follows:

Figures 1 thru 8 show the first and second forms of the silent self adjusting valve lifter or tappet and which comprises a simple construction having few parts. It may be referred to as the clutching nut and screw compensator type; the first form comprising a split nut made of a plurality of segments, and the second form being a one-piece slotted nut as an alternate. These forms are operatively shown with a bearing guide release means for disengagement of the clutch, although my novel cam means release may be used.

Figure 1 is a fragmentary view of an engine cylinder and spring loaded poppet valve, the latter on its seat, and the cam has reached a position to positively clutch or set up the self adjusting tappet parts in rigid relation, before the cam lobe reaches the cam follower, to lift the valve off its seat.

Figure 2 shows a face view of the cam shaft and its cam projected from Figure 1, but with the lobe of the cam in down position.

Figure 3 shows a plan view of the valve lifter, as developed on the plane 3—3 of Figure 1, and looking down on the segmental or two-piece clutching split nut resting on the tappet sleeve which is in its cylindrical bearing guide.

Figure 4 is a section on the line 4—4 of Figure 1.

Figure 5 is an assembly section showing the self adjusting unit relaxed and free for compensation, and it has, in fact, automatically expanded to take up for wear and/or contraction of a shortened valve stem, as shown by the position line X.

Figure 6 shows the valve and its lifter in open or up position. The dotted lines show the valve-closed position of the self adjusting unit in the tappet sleeve. It has compensated for elongation of the valve stem, as shown by the reference line Y in comparison to the line X.

Figure 7 is a cluster or separated view of the parts constituting the first form of the invention.

Figure 8 shows two views of a modified one-piece slotted clutching nut means well adapted for use in connection with the first form of the invention, and it may be considered as a second form.

Figures 9 thru 14 show a third and fourth form of the automatic valve lifter designated as the threaded valve stem type. In these two forms, it is the clutching nut which is the compensator per se, or movable element of the self adjusting unit, instead of the screw heretofore mentioned. The problem of positively restricted control of rotation of this clutching nut is just as effectively provided for here as in other forms of the invention.

Figure 9 is an assembly section of the third form showing the cam and tappet combination with the valve on its seat, and the clutching nut has screwed down on the valve stem as the latter contracted, as shown by the position line X. The clutching nut has locked on the valve stem screw by engagement of the active or clutching arc on the heel of the cam. The tappet has, therefore, rigidly set up and conditioned itself and is ready, before the cam lobe reaches the cam follower, to lift the threaded valve stem.

Figure 10 shows that the engine cam has moved out of contact with the tappet to free the clutching nut which, in this position, has screwed up to accommodate an expanded valve stem, as shown by the line Y in comparison to line X.

Figure 11 shows a fragmentary view of the upper end of the valve lifter, specially shown in exaggerated unclutched, relaxed and free position, by which the compensating clutching nut automatically adjusts itself to a change in valve stem length to hold a no-clearance contact.

Figure 12 shows a section on the line 12—12 of Figure 9 to better illustrate a split guide by which the valve stem with large threads is assembled in the engine.

Figure 13 is a section on the line 13—13 of Figure 9 looking down on a spring seat which transmits the load of the spring to the valve stem and by which a valve stem having enlarged threads is assembled in this type of valve operating mechanism.

Figure 14 shows a cluster or exploded view of the parts which may be used in constructing the above explained third form of the invention. However, the thread formation of the valve stem and split nut in Figure 12 is slightly modified and hence is suggested as a fourth form of construction because here the threads may have an outside diameter equal to or less than the valve stem.

Figure 15:
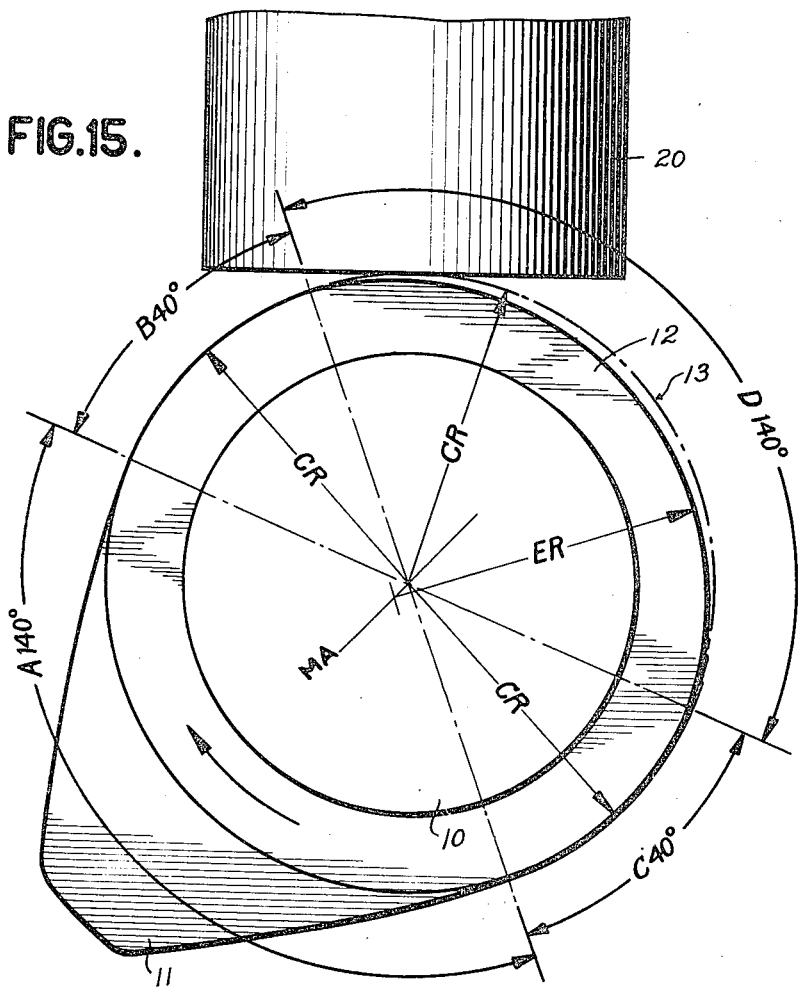
Figure 16:
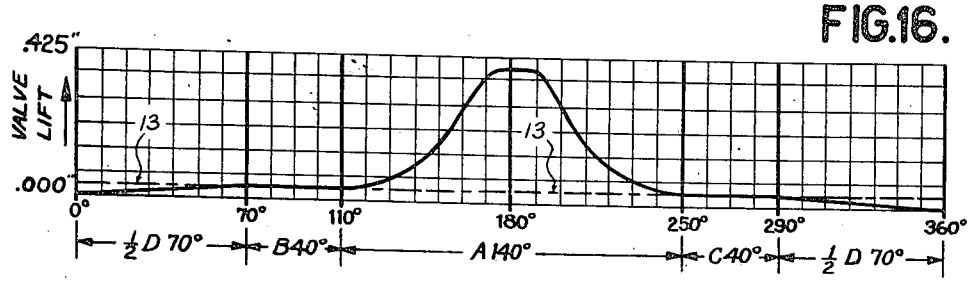

Figure 15 shows a diagrammatic outline of specially formed novel cam means preferred for use in combination with the several tappets. This cam is shown throughout the drawings in operative relation with several forms of tappets from Figure 1 thru 21, but it can also be used with the other valve lifter in the remaining views. Figure 16 shows a chart development of the novel cam outline in Figure 15.

Figures 17 thru 21 illustrate a fifth form of the invention and which may be referred to as having an inclined spiral plane with a valve lifting thrust plug having a load carrying pin. Here a somewhat different type of clutch is shown to control the rotation of the thrust plug or compensator. This construction may employ a roller cam follower as an alternate for the flat cam followers heretofore illustrated. A roller follower may, however, be used with any or all species of the invention.

Figure 17:
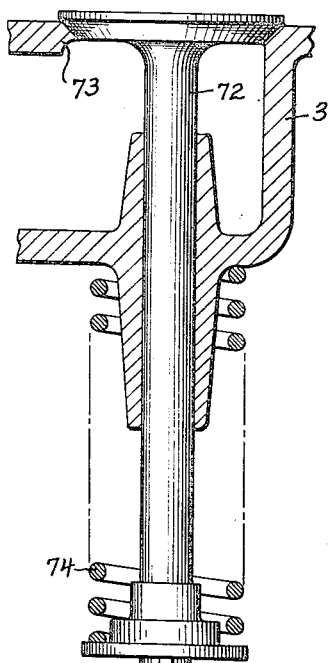
Figure 18:
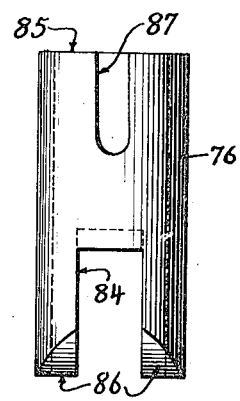
Figure 21:
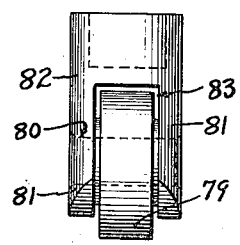

Figure 17 shows a valve assembly with the tappet in contracted position to accommodate the elongated valve stem which may have become heated due to operation of the engine; and Figure 18 shows a similar, but face view, except the tappet has elongated to take up the play between it and the valve stem which has shortened due to cooling or the wearing of parts. The reference pointers X and Y show the contracted and expanded valve stems, the space XY illustrating an exaggerated variation in valve stem length condition to more fully portray the mode of operation.

Figure 19:
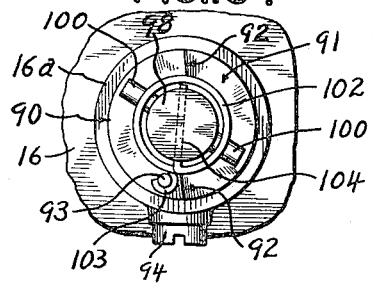

Figure 19 is a plan view of the valve lifter developed on the plane 19—19 of Figure 18.

Figure 20:
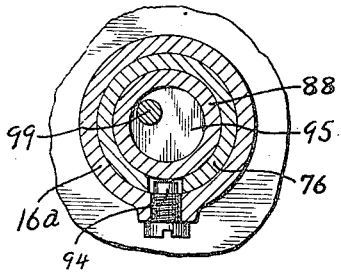

Figure 20 is a section on the line 20—20 of Figure 18, looking down on the eccentric pin and other parts of the clutch.

Figure 21:
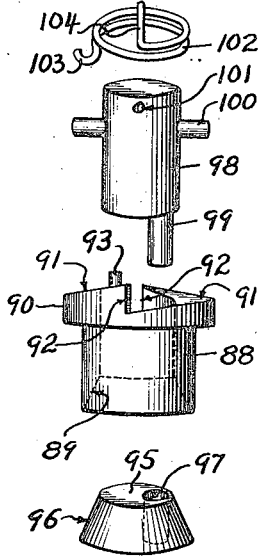

Figure 21 shows a cluster view of the component parts, in line and order of assembly, of this fifth form of construction.

Figures 22 thru 26 show a sixth alternate form of construction made in accordance with the principles of this invention and which may be referred to as the wedge compensator and wedge clutch type. The invention is here shown in connection with a standard or conventional cam, although it is to be understood that the novel cam means of Figures 15 and 16 may also, and preferably, be used.

Figure 22 shows the valve, cam and tappet assembly. The cam is approaching its lift position and the wedge compensator has elongated upwardly to maintain an effective no-clearance working contact with a shortened valve stem. Figure 23 shows a similar view except for a lengthened valve stem which caused the tappet to contract. In both views the cam has reached a position free of the tappet sleeve follower so that the wedge compensator and its control clutch housed therein are free to compensate if necessary.

Figure 24 shows a new position of parts wherein the conventional cam is actuating the tappet and valve stem, and during this action the wedge clutch is immovably locked to restrain the wedge compensator from movement.

Figure 25 shows a front view of the tappet removed from the cam and valve assembly. The tappet sleeve is broken away to expose the wedge clutch through which the force of the cam acts to lift the valve. The dash and dot line is merely a reference line to show an exaggerated or abnormal unclutched position of the wedge clutch. Rather than separation of parts, as shown by the dash and dot lines, there merely occurs a definite relief from pressure. Inasmuch as there is no spring or other force tending to separate the clutch parts and because of the speed of the cam, together with the viscosity of oil usually present, the clutch parts remain in contact.

Figure 26 is a cluster or group alignment view of the tappet parts constituting this sixth form of construction.

*The first and second forms of construction as shown in Figures 1 thru 8*

In describing these two forms of the invention, reference is first made to Sheets 1 and 2 of the drawings. There is shown a fragmentary portion of an internal combustion engine or other machine having poppet type valves. In this connection, a conventional engine is indicated at 3 and has a piston 4. A valve 5 closes the usual exhaust or intake port defined by a valve seat 6. A valve stem 7 is mounted in a guide 8 and a valve spring 9 maintains the valve 5 on its seat 6 in the usual way. A cam shaft 10 preferably carries a novel cam means, the lobe 11 of which is adapted to raise and lower the valve lifter or tappet of this invention for opening and closing valve 5. This cam 11, 12 is a departure from conventional cams and I employ it especialy in internal combustion engines in a novel manner with my automatic tappet. Among other things, this cam is constructed with an eccentric drop or heel 12, and it is shown in Figures 15 and 16 where it will be further explained. However, it is to be understood that my invention may be used with a standard or conventional type cam.

The subject matter of this invention primarily relates to automatic two-way self adjusting valve lifters, which for brevity may be called tappets, interposed between the free end of the valve stem 7 and the cam 11, 12 for the purpose of operating the valve 5 for admitting and discharging gas to and from the engine cylinder in timed relation with the operation of the engine piston 4 as well known to those conversant with the art. The tappet has long life and maintains a no-clearance working relation between all parts from the valve seat 6 to face of the cam.

A tappet guide, in the form of a stationary cylindrical bearing sleeve 14, with integral flange or similar means 15, is anchored in the machine housing or engine crank case 16 in any suitable manner, as by a tie-fork or bracket 17 which usually secures two of the bearing guides 14 in stationary position. Any suitable guide or tappet retainer 14 may be used in connection with this invention, and in the present instance the guide is shimmed up or accurately and precisely positioned by one or more shims 18, or otherwise installed, for the purpose of finely gaging and setting the top edge 19 thereof in unclutching control relation with the compensator element per se, as later described.

The first two forms, Figures 1 thru 8, of the invention includes a combination valve lifter and cam follower sleeve 20, one or the upper end of which is open to receive and house the parts comprising the self adjusting unit. The other end of the sleeve is closed to form a cam follower as in standard practice. The open end of the sleeve cam follower 20 is bevelled inwardly, reducing in diameter toward the closed end of the sleeve, as shown at 21, on a suitable angle or taper to coact with a clutching nut means which comprises two segmental or complementary parts 22 and 23 which are internally threaded, as at 27. This combination clutch and nut means 22, 23 has a stop flange 24, larger and thus overhanging somewhat the sleeve 20 and guide 14, and is adapted to coact with the stop edge 19 of the guide 14 by coming to rest or seating thereon. The clutching nut 22, 23 is also made with a circular beveled, tapered or conical surface 25 which is the counterpart of and coacts with the sleeve end 21.

The above described plural segment clutch 22, 23 is freely mounted in the conically open end 21 of the cam follower sleeve 20 and reciprocates therewith during the operation of the cam means 11, 12. The nut also preferably includes a reduced cylindrical end, cuff or skirt means 26 adjoining the cone 25 and which fits freely within and is guided and supported by the tappet sleeve 20. The lower end 26 of the clutching nut is relieved in size and is slightly less than the inside diameter of the sleeve 20 so that said nut may undergo slight contraction or expansion within its housing sleeve 20 for pressure application and release in respect to its controlled compensator screw, as later explained. The coacting tapers 21 and 25, when under pressure, act to contract the segmental clutching nut 22, 23 as will be seen. It is noted that the pressure of the spring loaded valve 7, when off its seat, is carried through the coacting engaged taper seats 21 and 25, thereby contracting the nut 22, 23. Conversely, a relief or retraction of the pressure at this point affords perceptible expansion or slight opening up of the clutching nut.

The contractible clutching nut 22, 23 is ordinarily made and threaded in one piece and then split at 28 into two or three parts, or it may be slotted part way through, as in Figure 8, to form a one-piece clutching nut 37. The internal threads are properly selected as a type, form and pitch. When the two mating clutch parts 22 and 23 are mounted in the sleeve 20, there is left adequate clearance space 28, for the purpose of allowing the segments to slightly move in function, relatively and radially in respect to their axis, by which to grip and release a spring actuated compensating screw 29 which has threads 30 meshing in threads 27 of the parts 22 and 23. The upper end of the screw 29 may include a head 31 forming a seat on which the tail or free end of the valve stem 7 engages or rests with a constant no-clearance relationship or contact. Such a no-clearance engagement, as afforded by my inventions, saves frequent manual adjustment and engine repair, affords a softness of valve closing and smoothness in operation for the life of the machine.

A spring anchorage hole 32 is made in the compensator or screw 29 and, likewise, a similar socket 33 is made in one of the clutch or split nut members 22 or 23. A tensioning or force-applying means, in the form of a coiled torque spring 34, is wound about the smooth screw shank 29 and has one end secured in the screw hole 32 and its other extremity inserted in the hole 33 of the nut. Thus the clutching nut 22, 23, its screw 29, and the torque spring 34, are operatively assembled to organize the compensating or self adjusting unit of the automatic tappet, of which I sometimes name the screw 29 itself as the compensator per se. Torque is exerted by the spring 34 on the screw and nut in opposite directions when the compensating unit is assembled in the sleeve 20, with the result that the valve rest head 31 has constant no-clearance engagement with the valve. It is significant that the torque spring 34 in my invention reacts between the clutching nut 22, 23 and its control screw 29 and, consequently, the tappet sleeve 20 is entirely free of any force or impulse exerted by said torque spring.

The automatic tappet parts are assembled somewhat in the order shown in Figure 7, by first placing the segmental clutching nut parts 22 and 23, with screw 29 in threaded engagement therewith, and attaching the spring 34 as illustrated in the assembly views. Thus is provided the essential three element self adjusting unit which is light in weight and of few parts. This unit is mounted in the tapered mouth 21 of the sleeve, and the coacting tapers 21 and 25 engaged so that a valve lifting force exerted by the cam lobe 11 longitudinally up the sleeve 20 is transmitted laterally to the threaded clutching members 22 and 23 which results in clamping or pinching the latter on the screw 29 and its threads 30. This action immovably locks the screw body within the clutching nut and positively prevents relative rotation thereof.

The method of assembly of the valve operating mechanism in general will now be briefly explained. The complete valve lifter 20 and its compensating unit is now placed in the bearing guide 14 with the lower end of the sleeve cam follower resting on the cam, between the lobe 11 and heel 12, as shown in Figure 1, accomplished by setting the lobe 11 or the major axis MA of the cam, see Figure 15, in a generally horizontal direction. In this way the self adjusting tappet is operatively set up and initially positioned in relation to the eccentric heel portion 12 of the cam. The mere weight of the assembled tappet, or assisted by the light touch of one's finger, firmly seats the sleeve follower 20 in operative engagement with the cam means, Figure 1 position, and at the same time the cone or taper surfaces 21 and 25 are also in effective engagement. Also the valve 5 is held to its seat 6 by the spring 9 so that the end of the valve is normally located for the valve lifter assembly. The torque compensating spring 34, having previously been wound for tension before assembly, now exerts torque on the screw 29, to provide a sensitive spring actuated member, which quickly runs the head 31 outwardly against the tail end of the valve stem 7 into no-clearance contact therewith.

Having assembled the parts in the foregoing manner, by preferably holding with one's fingers the screw 29 against rotation by the torque spring, the shim or shims 18 are now accurately adjusted, to a proper thickness, either by adding more shims 18 or by removing one or more until the top open edge 19 of the guide 14 lightly contacts the stop flange 24 of the clutching nut. Proper assembly will leave the screw head 31 a latitude of rotative adjustment up or down so that the valve stem 7 may shrink or grow and the screw will follow or yield. The tie or anchorage fork 17 is now finally secured in place against the flange 15 and the assembly of the valve operating mechanism is completed, with the self adjusting tappet confined for free reciprocating motion in the guide 14, under the operating action of the cam shaft 10, and a no-clearance working relation is established throughout the train of parts from the cam to the valve seat in the engine cylinder.

It is to be noted that the compensator screw 29 has a top and bottom stop means in the head 31 and spring 34. Should the valve stem 7 break or some obstruction occur in the train of valve operating mechanism, the torque spring 34 quickly reaches its limit of outwardly propelling action on the screw 29 and thus limits its screwing action. Likewise the screw head 31 stops against the clutching nut to limit the down or inward rotative adjustment of said spring actuated member 29. No danger, therefore, exists as to possibly driving the valve 7 out thru the cylinder head with consequent damage to the cam shaft 10.

In operation, the inwardly converging mouth 21 of the sleeve 20 drops or slides in the guide 14 just below its top edge 19 by which to attain coaction between the nut flange 24 and guide 19. This action effects transfer of the valve load to the guide 19 when the valve stem 7 expands and such action initiates automatic compensation, but this operation depends on a cooperating cam action, and accordingly will be later explained.

*The cam means in Figures 15 and 16*

At this stage of the description, reference is made to Figures 15 and 16, large scale illustrations, for an explanation of a preferred design of the cam means 11, 12 which, with the other mechanism produces a new combination or organization of valve operating mechanism. This cam is advisedly used with all forms of valve lifters presented herewith and is illustrated in connection with the modified valve lifter in Figures 9 thru 14. The cam is novel in its structural form for engine valve actuation and constitutes a new element in a new combination with my novel valve tappets. Figures 15 and 16 are diagrammatic and enlarged to more readily illustrate the new cam construction which is characterized by a new mode of operation by reason of the fact that it actuates the clutch in a novel manner and the clutch in turn controls the self adjusting means to perform its function of compensation in two directions, in or out of the sleeve 20, to maintain the no-clearance operative relation.

The shaft 10 carries the lobe 11 with an eccentric cam drop or heel 12, as heretofore mentioned, and the relation of the lobe and heel arcs will be further explained in connection with Figures 15 and 16. The arc or circumference of the eccentric heel 12 is generated by the eccentric radius ER which is eccentric to the shaft 10 as shown, and this structure is laid out to large scale to show the eccentricity of said heel 12 in relation to what ordinarily is the concentric face indicated in dot and dash lines at 13 if the cam were made in conventional or standard form as, in fact, portrayed in Figures 22, 23 and 24. These latter views will be hereinafter described merely for the purpose of bringing out the fact that my automatic tappets may indeed be operated by ordinary standard cams of any conventional design, but improved performance is attained with my new cam 11, 12 in Figures 15 and 16.

The concentric arc or imaginary face 13 of the cam, in dot and dash lines, may be referred to as the base circle of a conventional cam. In producing my preferred cam 11, 12 this base circle 13 is ground or cut away along an arc or cam face D, measured by said angle D, which is shown here as about 140°, more or less, depending upon the time desired by a particular manufacturer for unclutching and resting the tappet to allow it to compensate. The base circle 13 of a cam is concentric with its shaft 10 and is developed by a concentric radius CR shown a number of times on the diagram for clarity. The imaginary base circle 13 is dotted in on my drawings merely as a reference line to better emphasize the eccentricity of the heel or drop 12. The complete base circle of the cam is measured by the arcs B and C with a continuation thereof along the dot and dash lines 13, the latter actually representing the metal or stock which is ground away to produce the eccentric heel 12 and hence a new and preferred cam element in the general combination. It is now understood that the concentric radius CR has its center at the axis of the shaft 10. On the other hand the eccentric radius ER may have its center on the major axis MA of the cam between the lobe 11 and axis of said shaft 10, or thus approximately located since considerable latitude is permissible for the center of the radius ER.

In this cam design, the eccentric heel 12 is, therefore, subtended by the angle or arc D of about 140° and merges or feathers into the concentric arcs B and C which are defined by the concentric radius CR. The eccentric heel 12 may in fact be formed anywhere within the limits of something like 100 to 180 degrees, more or less, but which is indicated on the drawings as being 140° because this angular measure affords satisfactory operation in my new valve operating combination and is merely used as one example in describing this invention.

Each of the oppositely disposed concentric arcs B and C, adjacent each foot or approach of the lobe 11, is subtended by approximate a 40° angle, as shown. The two arcs B and C are also developed by the concentric radius CR, the same as the radius of the imaginary base circle 13, said radius CR having its center concentric to the shaft 10, being the center about which the cam 11, 12 rotates in the engine. While 40° is shown as a satisfactory length of working cam face B and C, adjacent the lobe 11, it is to be understood that this factor is somewhat flexible, depending upon the particular requirements in reference to the type of engine embodying this invention. I have found that a range of 20 to 60 degrees, more or less, may be used as a satisfactory length of concentric cam surface B and C, but I show 40° as one example to illustrate this invention. In designing an engine, an efficient compromise is readily effected as between the respective angles which subtend the cam faces B and C on the one hand and D on the other.

The foregoing leaves an arc A of about 140° over which to lay out the lobe or lift 11 of the cam which performs the thrust operation against the tappet to open an engine valve. Here again manufacturing requirements may vary by which to form the cam lobe 11 within an arc of more or less than 140° depending somewhat upon the compromise or selection attained between the other three arcs B, C and D. It is found that the example of cam shown, with the working faces laid out by the several angles A, B, C and D, operates very satisfactorily with these self adjusting valve lifters, but it is understood that considerable latitude is permissible in measuring off the number of degrees for the cam lift 11, for the concentric clutching or set-up arcs B and C, as well as for the eccentric declutching release arc or drop D of the cam.

The eccentric unclutching drop D, being the heel 12, of the cam is preferably employed for the purpose of relaxing the tappet for rest and automatic compensation, should the latter need exist by reason of a change in length of any part in the valve mechanism. Relaxation ensues along the unclutching arc D or heel 12 because the eccentricity thereof removes all pressure from the sleeve 20 and hence from the segmental clutching nut 22, 23 or one-piece nut 37, which results in releasing the screw 29 for such slight rotary adjustment in either direction as may be required to maintain a zero contact or no-clearance engagement with the valve stem 7. It is required that only a few thousandths of an inch maximum drop or relief actually exists at the point of greatest difference between eccentric cam face 12 and the concentric imaginary base circle 13. In actual practice, I have used a drop of from two to four thousandths up to ten or twenty thousandths or sometimes more. This is explained in view of the fact that considerable latitude is permissible in finishing off the cam 12 and relieving it for eccentricity at ER to modify it from an ordinary concentric or standard cam, the latter usually being developed on a concentric radius CR and indicated generally at 13.

The concentric cam faces B and C, of approximately 40°, are used for setting up and engaging the clutch 22, 23 by which the compensator screw 29 is positively locked against rotative adjustment for the entire period the arcs A, B and C are traversing the valve lifter 20. Note that this precisely timed and controlled locking of the screw 29 within its clutching nut 22, 23, or the one-piece nut in Figure 8, positively occurs prior to the cam lobe 11 having reached the cam follower sleeve 20, and continues until after said lobe leaves the tappet. Assuming that the cam rotates clockwise, as indicated throughout the views, then it is the clutching or engaging arc B which gradually sets up, locks and pinches the clutching means about the screw 29 before the lobe reaches the tappet 20; and in the same way it is the opposite or companion arc C which maintains the clutching means in that rigid state after the lobe leaves the tappet. Therefore, I have specially devised an automatic valve tappet which is positively restrained against self adjustment during the time the valve is off its seat. Only during the period of traverse of the eccentric heel 12, which represents the major period the valve is on the seat, can automatic compensation take place. In this way, no wear occurs in the self adjusting unit, because its slight actuation, rarely occurring, is never under the stress and strain of the spring loaded engine valve and cam lobe.

The cam faces defined by the arcs B and C are used in assembling the valve operating mechanism and constitutes a convenience in this respect because it is desirable that the assembly be effected with the clutch 22, 23 contracted and locked about the compensator screw 29. The engine valve 5 being seated, the mechanic simply rotates the cam shaft 10 until the lobe 11, or the major axis MA, lies in a general direction at right angles to the axis of the tappet sleeve 20, as in Figures 1 and 9, whereupon said sleeve 20 normally rests on either arc B or C. In this position, the mechanic, who assembles the valve and its operating mechanism, is now ready to set the tappet bearing guide 14, or 49 in Figure 9, in operative relation with the clutching nut flange 24. He readily does so by using the shim or shims 18 or 50 to accurately set up the guide 14 or 49 in precisely engaged contact with the clutching nut, doing so with light contact, as by the weight of the parts resting one on the other, or by slight pressure of one's finger, until the flange 24 merely rests on the top edge 19 of sleeve 20. Having effected this assembly, the mechanic tightens down the anchorage fork 17 and the assembly job is completed with a precisely set up clutch adjustment, whereby the compensating unit in the tappet sleeve 20 is locked against automatic adjustment when said sleeve 20 is riding the cam heel arcs B or C, as well as the lobe 11, and is released for rest and self adjustment when traversing the eccentric declutching heel portion 12 defined by the angle D.

Reference is now made to Figures 5 and 6, as position views, wherein is shown the parallel dot and dash reference or pointer lines X and Y which diagrammatically disclose, on a large scale, the lost motion or play which would otherwise exist between the valve stem 7 and tappet 20 if it were not for the positive self adjusting function of the invention in these several forms of tappets. The reference lines XY precisely point to the bottom end surface of the screw 29 when the latter is at its lower-most position in both views which means that the valve head 5 is on its seat 6. This position of parts affords a comparative reference to explain the operation. The range of valve stem variation in length, represented by the distance XY, is merely an enlarged showing of the few thousandths of an inch play which ordinarily must be left in conventional valve operating mechanism of engines not equipped with self adjusting means. This clearance extends upwardly to forty and fifty thousandths of an inch in airplane engines with unusual hammering and impact deterioration of the valve mechanism and serious wearing of the valve seats. The pointers X and Y enable the reader to quickly ascertain that in Figure 5 the tappet has elongated itself to accommodate a shortened valve stem, while in Figure 6 the tappet has shortened itself to accommodate valve stem expansion. Throughout the range XY of length variation, the screw head 31 held its constant no-clearance engagement with the valve 7.

The performance of the automatic tappet to maintain its no-clearance relation against a gradually shortening valve stem, as when the engine stops running and is cooling off, is more fully seen by considering Figure 5, where the reference line X points to a shrinking valve stem 7. The compensating function in this respect is of the simpler mode of operation because the torque spring 34 merely keeps the compensator screw 29 turned outwardly by an unscrewing movement relatively to its clutching nut 22, 23 and thus follows the valve stem 7 which is receding due to the cooling thereof, or possibly a slight wearing of its lower end. As the valve stem 7 shortens a few thousandths of an inch, it follows that the stop flange 24 no longer reaches its stop rest 19 as in normal operation, and the cam heel 12, therefore, has a pronounced releasing and unclutching effect since the load of valve is eased at the tapered seats 21 and 25 when the seat 6 receives said load. The lost motion which thus tries to develop at XY, or at the screw head 31, is instantly taken up during the very next rotation of the cam when the lobe 11 is in down position as in Figure 5. This action follows by reason of the cam heel moving away from and freeing the follower 20 which results in removing all load or pressure from the entire tappet assembly, certainly from the follower sleeve 20. This load relief instantly removes all pressure from the clutching elements 22 and 23, and frees the compensator screw 29 embraced therein so that it relaxes from locked condition. The inherent resiliency of the clutching nut expands it and almost imperceptibly increases its inside screw threaded diameter, whereupon, the wound-up torque spring 34 unwinds and propels the screw 29 up or out of the tappet sleeve 20 by urging or turning said screw counterclockwise, as viewed from its top in Figure 3, thereby maintaining the screw head 31 snugly against the valve stem.

Consider next the opposite performance, i. e., self adjustment to accommodate a gradually lengthening valve stem 7, which is an operation reverse to that explained in the foregoing paragraph. Hence the self adjusting unit, its screw 29, must back down into the cam follower sleeve 20, proportionately to the expansion of the valve stem. For an understanding thereof, Figure 6 is examined where the reference line Y shows that the screw 29 is further down in the sleeve 20 because of the hot expanded valve stem 7, or the valve head 5 may have worn its seat 6 a few thousandths of an inch. Here it is the expanding force or load of the valve spring 9 which enforces compensation for valve stem elongation, because the flange 24 comes to rest on its guide stop 19 before the valve head 5 fully seats at 6, with the result that all the load of valve spring 9 is suddenly imposed on the stop means 24, 19. In this state and relation of parts, the cam heel 12 now traverses the tappet sleeve 20 and the few thousandths of an inch eccentricity or surface drop at 12 acts to relieve the load and pressure at the cone seats 21 and 25. Instantly the clutching nut loses its grip on the screw 29 and the torque spring 34 yields and winds up under the superior pressure of the spring loaded valve 7 which urges the screw downwardly into its released clutching nut.

To continue the foregoing explanation, the pitch or angle of the coacting threads 27 and 30 is sufficient to translate the thrust load of the valve stem 7 into rotary motion of the screw 29 with the result that said screw now rotates clockwise, as viewed in Figure 3, and hence backs down, proportionately, into the nut 22, 23 by increase of the slightest elongation of the valve stem 7, but no further than such increase because the torque spring 34 yieldingly resists and thus holds the screw head 31 to the valve stem. The pitch or lead of the coacting screw threads 27 and 30 in the compensating unit is just adequate or sufficiently critical to permit the spring loaded engine valve 7 to overcome the resistance of the torque spring 34 and rotate the spring actuated compensator member 29 back down into its clutching nut. Thereupon said member 29 is again instantly locked because the starting pressure between the stops 24 and 19, which initiated downward rotative adjustment of the screw 29, is now relieved; whereupon, when the cam reclutching face B again, reengages the clutch 22, 23 by returning the working pressure of said cam to the cone surfaces 21 and 25, it follows that the screw is again locked. All of this operation transpires as the 140° face D of the cam traverses the tappet.

The above described returning of the compensator screw 29 back down into the nut 22, 23, as the engine heats and valve stem 7 expands, winds up and retensions the yielding, though expansive, torque spring 34 for the next outscrewing operation to meet the reverse requirements, as in Figure 5, heretofore explained. It is significant that the controlled and stationary condition of the screw 29, embraced within its clutching nut 22, 23, is instantly changed if and only when the valve stem 7 actually elongates because at that time only does the increased length of the valve stem act to enforce self contraction of the tappet. So long as the valve head 5 is reaching its seat 6, simultaneously with the flange 24 reaching its rest 19, normality exists and no actuation of the self adjusting elements occurs.

When the concentric cam arc B or C, depending upon which direction the cam is turning, engages the cam follower 20, cam pressure and/or spring load is again exerted on the coacting load carrying cone surfaces 21 and 25, thereby instantly transferring the load and pressure of the cam to the clutching nut and thereby causing it to grip, lock and carry the screw 29, now precisely equalized or self adjusted to the new length conditions, between the clutch members 22 and 23. The entire tappet assembly is now solidified, so to speak, and rigidly set up in condition for transmitting the upward thrust from the cam lobe 11 to the valve stem 7.

The cam means may rotate in either direction, but the views show clockwise rotation. For emphasis, it is not to be overlooked that the concentric cam face B positively effects a non-yielding engagement of the clutch 22, 23 about the screw 29 a short time before the lobe 11 begins to lift the sleeve 20. Also the opposite concentric arc C intervenes between the lobe 11 and drop 12 and, therefore, the eccentric heel 12 only relieves the load and pressure from the sleeve 20 to relax the tappet for automatic compensation after said lobe 11 has fully parted from the sleeve 20 and the engine valve 5 has seated. This is important because the clutch is firmly set up and held to a non-yielding rigid state before, during and after the lobe 11 acts on the tappet. No possible slippage of the cltuching nut 22, 23 and no possible rotation of the compensator screw 29 may, therefore, occur just before, during and just after, the lift of the valve stem 7. This feature prevents wear inasmuch as there is a complete absence of sliding frictional contact between parts bearing a load or pressure originating from the cam shaft 10 or the valve spring 9.

An alternate form of clutching nut means 37 is shown in Figure 8 which is only partially slotted, as at 36, and is especially designed for use in connection with the first form of the invention above described. It has a possible advantage of affording a one-piece structure to avoid an additional part should a manufacturer desire that feature. However, a split and separable or segmental nut 22, 23 more quickly snaps upon the screw 29 in the assembly operation. The slot 36 runs diametrically through the axis of the nut but stops short of cutting through thus leaving the two halves joined together at 37. The screw threads 38 are made in any suitable form or pitch. This nut also has a cone surface 39 to coact with the load carrying and transferring sleeve taper seat 21 and also has a tappet guide stop or clutch release flange 40 for coaction with the stop end 10 of the tappet guide 14 in the same manner as heretofore described in connection with the flange 24 on the clutching nut 22, 23. This one piece clutching nut 37 carries and controls the compensating screw 29 in the same manner as the segmental nut. The small amount of stock remaining opposite the slot 36 provides adequate resilience to promote contraction and expansion of the nut by which it grips and releases the screw 29.

*The third and fourth forms shown in Figures 9 thru 12*

This form of the invention is similar in principle and mode of operation to that already described, but I employ a clutching nut 46, 47 as the spring actuated responsive and movable compensator element instead of the screw 29 as heretofore explained. It is noted that the usual engine valve 42 is closed on its seat 43 by a valve spring 44 in the usual way. This form of construction reduces the number of parts and provides the threads of the screw element directly on the lower end of the valve stem and integral therewith.

The two operation or position views, Figures 9 and 10, show an exaggerated change in valve stem length, and to more fully bring out this condition a reference line X shows the contracted valve stem and line Y the elongated stem. This diagram, therefore, shows a difference or range XY of variation in length of the valve stems due to general operating and temperature conditions. The reference pointers XY are laid out precisely in the plane of the end surface of the valve stems to show on an enlarged scale the variation in thousandths of an inch of the length of parts comprising the valve operating mechanism.

An enlarged thread 45 is formed upon the tail of the valve stem 42 and cooperates with an automatic self adjusting split clutching means in the form of an internally threaded segmental nut or the one-piece nut 37, as in Figure 8, may be used. The segmental nut comprises two or more complementary members 46 and 47 having a stop flange or load transfer means 48 adapted to come to rest on the top edge of the tappet guide 49 which is precisely machined and fitted in or to the engine 16 or shimmed up at 50 so as to definitely stop or arrest the downward travel of the clutching nut when the engine cam turns to its down position. Hence is freed the valve stem threads 45 from clutched pressure so the spring actuated compensator nut 46, 47 may itself rotate relatively around the threads 45 to effect automatic adjustment and afford positive though soft and quiet no-clearance closing of the valve on its seat 43.

The clutching nut 46, 47 likewise has an external tapered shoulder 52 which coacts with its counterpart or complementary internal cone or mouth 53 formed in the upper end of the tappet sleeve 54 confined for reciprocation in a guide 49. The self adjusting internally threaded clutching nut 46, 47 receives the threaded valve stem end 45 and these parts are assembled in the upper end of the sleeve 54 together with a torque spring of any suitable form, say a coil spring 55, which has one end anchored to one of the threaded clutch segments 46 or 47, and the other end coiled about and secured to the valve stem 42 within the follower sleeve 54.

A cam shaft 57 carries a cam comprising a lobe 58 and eccentric heel 59 adapted to reciprocate the combination tappet and cam follower sleeve 54 in its guide 49 to open and close the valve 42 relatively to its seat 43 and in conjunction with the valve spring 44. This cam is preferably the same as heretofore described. The eccentric heel 59 of the cam relieves the pressure from the tappet sleeve 54 upon each revolution of the cam, as shown in Figure 10, whereupon the compensating nut 46, 47 is free to creep or turn in either direction on the threads 45 to precisely adjust itself to an up or down variation of the valve stem 42 to finely reset itself to any variation in length of the valve stem by which to always afford positive but soft closing of the valve 42 on its seat 43 throughout the range of length variation XY.

As to valve stem elongation, see Figure 10 at the pointer Y, the clutch flange 48 seats softly against the top edge of the guide 49 due to such elongation, and the pressure of the spring loaded valve 42 is then exerted directly on the clutching nut 46, 47. The pitch angle of the threads 45 enables that pressure to be converted to torque which rotates said nut upwardly. This action takes place inasmuch as the coacting load carrying faces 52 and 53 are relieved of pressure, since the cam 59 traverses the sleeve without pressure thereagainst, which frees the clutch nut 46, 47 so that it expands and instantly rotates upwardly on the threads 45 of the non-rotating valve stem as the latter grows downwardly, so to speak, into the sleeve 54. This upward rotative adjustment is gradually urged or enforced by downward growth or expansion of the valve stem 42 and the nut 46, 47 creeps around the valve stem against and overcoming the torque of the spring 55, thereby rewinding and increasing the tension of said spring to store up sufficient force therein to accomplish a reverse adjusting action as next explained. The desired no-clearance engagement is thus maintained at all points.

Now as to valve stem contraction, see Figure 9 at the pointer X, and the mode of action is the reverse to that just described. In the first place, the clutching nut flange 48 does not tend to reach the upper open edge of the bearing guide 49 due to a gradual shortening of said valve stem. In other words, the valve 42 reaches its seat 43 first and a head of the flange 48 reaching its seat on the top edge of the guide 49. In this operating state, the clutching nut 46, 47 finds itself declutched from the valve stem screw threads 45 because the tappet sleeve 54 fails to maintain working pressure or thrust between the load carrying tapers 52 and 53, whereupon the previously wound torque spring 55 reacts and screws the nut 46, 47 downwardly until it does reach the top edge of the bearing guide 54 and stops thereagainst. Thus the torque spring 55 urges the nut 46, 47 downwardly toward the sleeve 54 precisely and proportionately the same distance as the contracting valve stem tries to withdraw it. In this way a constant no-clearance engagement is maintained at the separable load carrying seats 52 and 53 and at all other points.

With the approach of the cam lobe 58 towards the follower 54, but before engagement thereof, the cone seats 52 and 53 instantly set up the clutch means and reestablish a positively anchored and rigid relationship between the valve stem threads 45 and the rotatable compensator nut 46, 47. This function is accomplished by the clutching arcs B or C of the cam, as charted in Figures 15 and 16, depending on the direction of cam rotation. Hence no relative movement may occur within the self adjusting unit itself or between the tappet as a whole and the valve stem during the time the valve 42 is off its seat 43. Only during that period while the cam eccentric heel 59, as measured by the angle D in Figures 15 and 16, is traversing the tappet sleeve 54 may the compensating unit respond to and counteract for variations in valve stem length.

In Figure 11 it is noted that the tappet sleeve 54 has dropped down in the bearing guide 49 and the coacting conical load carrying seats 52 and 53 are noticeably separated. This is an abnormal condition which in reality does not exist in normal operation because there is no force other than gravity tending to move the tappet sleeve 54 down in the guide 49. This view merely brings out the fact that the unclutching action of the self adjusting unit, comprising nut 46, 47 with screw 45 and torque spring 55, is merely the functional result of pressure release, not motion, at and between the cone seats 52 and 53. The viscosity of the lubricating oil in and about the engine and valve mechanism, as well as the speed of the cam, are factors which prevent the sleeve 54 from perceptible movement away from the clutching nut 46, 47. Of course when the engine stops, the sleeve 54 may gravitate downwardly to a slight degree should the cam lobe 58 stop in down position. This relation is enlarged in Figure 11 as an aid to a discussion of these functions. It is significant that there is a complete absence of any or all agencies, such as spring means or the like, to hold the cam follower 54 in frictional running and wearing engagement with the heel of the cam. That action is specially avoided by my invention.

As an aid in assembling this form of the valve mechanism there is provided a split valve stem guide comprising two complementary sleeve parts 60 divided along the line 61. The valve stem 42 is first introduced downwardly through the engine valve seat port 43 and other parts then assembled. The compensator nut 46, 47 and its torque spring 55 are mounted in the cam follower sleeve 54 and in engagement with the threads 45, whereupon the two-part valve stem bushing 60 is mounted in the engine as shown. The valve spring 44 is also placed in position by mounting a stepped seat ring 62 upon a split locking washer 63 which is snapped within a groove 64 in the valve stem 42 and locked therein when embraced by said ring 62 under pressure of the valve spring 44. Inasmuch as the one or more screw threads 45 have an outside diameter somewhat greater than the valve stem 42, the split guide 60 and split spring seat 62, 63 afford a simple means of quickly assembling all the parts.

Reference is now made to Figure 14, more particularly the valve and its stem 67, for an explanation of an alternate form of threaded valve stem and automatic self adjusting lifter which is essentially the same as just described. However, this construction represents a further simplifying and reduction in number of parts. In Figure 14 the several independent screw threads 66 on the valve stem 67 and in the clutching nut 69, comprise several, say four, five or more, separate and independent thread grooves or ridges 66 having a pronounced pitch. The plural thread means 66 are formed along the tail end of the valve stem for a sufficient length to accommodate the nut 69 and its range of compensation up and down on the threaded valve stem 67.

The foregoing threaded construction is readily produced by tap and die operations and is economical in that respect. More particularly, the threads 66 are the same in diameter or may even be smaller in size than the valve stem 67 which distinguishes from the enlarged thread 45 on the valve 42. The tip end of this valve stem 67 is reduced and finished smooth at 68 and provided with a spring receiving hole 65 by which to operatively receive the torsion spring 55 heretofore described for imparting a creeping rotation to the compensator clutching nut 69, also having a spring receiving socket 70. This construction eliminates the split guide 60 and plural part spring seat means 62, 63 heretofore described as necessary in connection with the enlarged valve stem threads 45.

The threaded valve stems 42 or 67 normally do not turn to any considerable extent in their guides and consequently as said stem or stems grow longer due to a rise in temperature, the clutching nut 46, 47 is screwed up or out of the tappet sleeve by converting the force exerted by the engine valve spring 44 to torque which, aided by the pitch of the screw threads, acts to rotate the nut 46, 47 against the resistance of the torque spring 55 to maintain the flange 48 in softly seating or contacting relation with the top edge of the guide 49 at all times and precisely at the same instant the head of the valve 42 closes on its seat 43. The reverse performance takes place and the clutching nut 46, 47 or 69 screws down, this time because of the unwinding force of the torque spring 55, if the valve stem shortens, to maintain precisely an exact uniformity of timed engagement of the valve head on its seat 43 and the compensator flange 48 on the tappet guide 49. When this normal state obtains, it means that no variation in length condition, and hence no compensation, is taking place.

While any desired form of screw threads may be used for the self adjusting unit, the acme or buttress threads are well suited because it is found that they possess characteristics favorable to both clutching and unclutching. The V-thread in Figure 14 is also a desired form. A buttress thread is especially effective because it is unusually well adapted to the necessary clutching and releasing operation without perceptible movement of parts. The angle face on one side of a buttress thread, and the flat sroulder on its other side placed toward the spring loaded valve, characterizes the buttress thread for use in a novel way with my clutching nut compensating unit. Special provision in thread form and construction minimizes the amount of movement, such as contraction and expansion, necessary in the clutching means, and hence is an important feature in my inventions because I specially provide against undue action and relative travel of parts.

The foregoing descriptions outline a variety of clutching threaded self adjusting valve lifters presented as concrete examples of my invention, and the several forms have coacting threads of suitable pitch by which the angle or lead of the thread and the resistance of the torque spring are factors so combined and controlled that only a small portion of the pressure or load of the engine valve spring is converted to torque tending to slip the clutch. It is, therefore, apparent that the clutches operate and carry their load with a substantial working margin of assurance against slipping action or rotative effort of the moveable element around the stationary member. Hence the clutch means are not unduly strained when the force of the cam and the resulting load of the valve spring are imposed thereon because the threads, and not the clutch means, sustain the major portion of the valve operating load.

*The fifth form shown in Figures 17 thru 21*

In this form of the automatic valve tappet, the self adjusting unit includes a compensator per se in the forms of a thrust plug having a load carrying pin or stud which coacts with an inclined spiral plane to effect the two-direction adjusting movement by which to maintain the no-clearance load sustaining relation with the engine valve. It also includes clutch means constructed somewhat differently from the clutch heretofore described and which is auxiliary to and designed for controlling the self adjusting unit. The clutch has an amplified gripping factor whereby a minimum pressure to engage the clutch faces will carry an unusually large valve load without liability of slippage of the self-adjusting means. Likewise, this form of the invention is illustrated with a roller 79 as a cam follower instead of the sleeve type of cam follower heretofore explained. Also a specially designed cam means 75 is used in connection with this fifth form of the invention.

A valve stem 72 reciprocates in the usual valve guide to open and close the engine exhaust or inlet port and the valve head is normally held to its seat 73 by a valve spring 74 in the usual way. No matter how stiff or powerful is the valve loading spring 74, the amplified clutch in this form of construction is adequate to transmit the actuating force to the valve 72 against any type of spring an engine manufacturer may desire to use. The specially designed cam has a lobe 75 carried on a cam shaft 71 to operate the valve lifter mechanism carried within a tappet sleeve housing 76 which reciprocates in an engine bearing guide 16a carried on the engine base or crank case 16 as will be understood. The tappet sleeve 76 cooperates with the cam means and clutch mechanism by which to release the latter to allow the self adjusting or compensating unit to function, as will be explained. Any suitable alignment or guide means may be used to prevent the tappet sleeve 76 and roller follower 79 from turning in its bearing guide 16a, as for example, a screw 94 fixed in the stationary guide 16a with said screw end finished smooth and confined in a guide slot 87 in said reciprocating sleeve 76.

As to the cam, its form is a modification of the cam in Figures 15 and 16, and its lobe 75 defines the full width of the cam lift face or high side thereof, and the lobe face feathers into spaced concentric cam ridges or runs 77 which are concentric with the cam shaft 71. The cam is finished or ground out to relieve its heel a few thousandths of an inch at 78 between or centrally of the raised concentric cam runs 77. The groundout eccentric 78 is shown on an enlarged scale in the drawings for a better understanding thereof. The ground away face 78 is opposite the lobe 75 and is eccentric to the shaft 71, and may be five to fifteen thousandths, more or less, below the surface of the concentric ridges or camways 77 at the point of greatest depth. Thus is provided a cam means having two operating drop or heel surfaces, the concentric spaced heels 77 which act together as one, and the eccentric heel 78. The eccentric heel face 78 functions to release the clutch means and initiate automatic self adjustment when the valve stem 72 or other parts expand, and this action is accompanied by transferring the pressure of the spring loaded engine valve to the tappet sleeve 76 and thence to the concentric cam runs 77. However, no spring load or pressure exists between the cam runs 77, or on the eccentric surface 78 for that matter, and lower end of the sleeve 76 during normal operation. Friction and wear are, therefore, at a minimum.

The valve lifter sleeve 76 houses the compensating unit and its control clutch in the upper end thereof, and the lower end of the sleeve 76 receives the cam follower roller means 79 movable up and down therein. The roller 79 is journalled on a bearing pin 80 fixed in the lower part of furcations 81 of a roller carrying sleeve or cylindrical body 82 cut away at 83 to provide the furcations 81 and the opening 83 for the reception of said cam roller 79.

The lower end of the tappet sleeve 76 is slotted at 84, which is substantially the counterpart of the slot or cutaway 83, for the reception of the roller 79. The cam follower or carrier sleeve 82, for roller 79, is inserted into the lower end of sleeve 76, and the roller 79 turns freely within both openings 84 and 83. Hence the two slots 83 and 84 in the lower end of the telescoping sleeves 82 and 76 are lined up so that the roller freely turns therein. The smaller sleeve assembly 82, 79 is movably free within the sleeve housing 76 and adapted to undergo a most limited reciprocating movement equal to the few thousandths of an inch depth of the eccentric heel 78 below the surface of the concentric runs 77 by which to impose and remove pressure to and from the control clutch to be described.

The lower end of the tappet sleeve 76 has its two furcations finished on circumferences 86 concentric with the axis of the bearing pin 80 and roller 79. In other words, the two spaced circumferences 86 have radii equal to that of the roller 79, as shown in the side view Figure 17. The curved faces 86 ride on the spaced cam concentric runs 77 for the purpose of sustaining the load of the valve spring 74 while automatic compensation ensues when elongation of the valve stem 72 enforces such compensation, as will be more fully explained. The upper end of the tappet sleeve 76 is defined by the circumferential top open edge constituting a stop rest 85 which coacts with and receives the load of the elongated valve stem and its spring 74 when expansion of the parts brings about the self adjusting function.

The self adjusting unit will now be explained, and it includes a skirted sleeve or cuff guide 88, the lower inner end of which is made with an internal upwardly converging taper or cone shaped clutch surface 89. A flange 90 is integrally formed on the upper end of the cuff 88 and the top face of this flange is finished with two oppositely disposed inclined spiral planes 91, each of which terminates in diametrically opposite vertical faces or stop jaws 92. Each jaw 92 defines the lower end of one incline plane 91 and the upper end of the other incline plane 91. A spring anchorage pin 93 is secured in the flange 90 adjacent one jaw 92 and projects from the face of one incline plane 91. The flange 90 is made on a larger radius than its guide cuff 88 so that when the cuff is placed within the tappet sleeve 76, the flange 90 rests on the top open edge 85 of said sleeve. Hence the flanged cuff device 88, 90 removably fits in snug relation within the upper end of the tappet sleeve 76 and ordinarily rests stationary therein. This stationary member of the compensating unit is now seen to include a cylindrical bore in which is carried the compensator per se for rotative adjustment as will be later explained.

A clutch disc 95 has a cone face 96 which is the counterpart of the clutch face 89 in the cuff or clutch sleeve 88, and is adapted to movably fit therein. The clutch member 95 is made with a bearing hole 97 off center from the axis thereof and hence off center from the axis of the spiral inclined plane 91 and cuff 98. The upper and lower faces of the clutch disc 95 may as well be made flat and parallel, especially the lower face which rests on the upper end of the cylindrical carrier sleeve 82 in which the cam follower roller 79 is journalled.

A cylindrical member comprising a rotary thrust plug 98 is mounted for free and guided rotation within the cylindrical bore of the stationary flange and cuff device 88 and may be referred to as the compensator per se. The lower end of the thrust plug 98 carries an integral bearing clutch or actuating pin 99 off center from the axis thereof, and said pin has a combined rotary and sliding bearing fit within the hole 97 of the movable clutch disc 95. The thrust plug 98 and its cooperating clutch disc 95 have free rotative adjustment within and relatively to the flanged cuff 88 when the coacting clutch faces 89 and 96 are not under load or pressure imposed thereon by the spring loaded valve 72 or by the action of the cam lobe 75, but when under such pressure the clutch 89, 96 positively locks said thrust plug 98 against rotation within the stationary cuff 88 to unyieldingly actuate the valve 72. Hence the clutch means exercises positive control over the compensator plug 98.

A load carrying pin 100, in the form of projecting lugs, is carried near the upper end of the compensator plug 98 and is adapted to ride on the inclined plane 91, up or down there along. The load carrying pins 100, therefore, enforce a longitudinal movement of the self adjusting device 98 when the latter turns within the member 88, 90. At the same time the eccentric clutch pin 99 moves longitudinally and rotatably free within the bearing hole 97 of the rotatable clutch disc 95. A spring receiving socket 101 is drilled in the upper end of the thrust plug 98.

A resilient coil torque spring 102 has one end 103 fixed to the pin 93 and its other end 104 fixed in the hole 101, and is wound on the valve lifting thrust plug or compensator 98. This spring is assembled with a pronounced unwinding torque by initially coiling it for reverse action, the expansive unwinding force of which rotates the plugs 98 within the flanged member 90, thereby causing the load carrying lugs 100 to climb upwardly along the two inclined planes 91, thus moving the plug 98 out and up thru the cuff 88 toward and always in no-clearance engagement or snug contact with the free end of the valve stem 72.

The foregoing assembly of parts 95, 88, 98 and 102 constitute the compensating unit and controlling clutch auxiliary thereto. These parts are shown in order of assembly in Figure 21 for full understanding thereof. The compensator 98 is positively controlled by its clutch 96, 89 as respects its rotation in either direction.

The rotary clutch disc 95 rests on top of the carrier sleeve 82 and the rotary spring loaded thrust plug 98 has its upper end engaged against the lower extremity of the valve stem 72 by positive no-clearance relationship therewith. This mechanism is preferably assembled with the load carrying pins 100 disposed midway between the stop jaws 92 of the spiralled flange 90 so that the tappet is capable of automatic compensation up or down for contraction and expansion of the valve stem 72 to compensate for variations in valve stem length throughout the range indicated by the pointer lines X and Y.

During normal engine operation when the working temperature is constant, the automatic tappet maintains its no-clearance relation between the thrust plug 98 and tail end of the valve 72 without internal motion in the self adjusting unit or its control clutch. The downward pressure or load of the valve spring 74 is imposed upon the valve seat 73, necessarily so because the no-clearance between valve stem 72 and plug 98 does not support the valve stem when the valve is on its seat 73. It must, therefore, be borne in mind, under normal working conditions and when the valve 72 is closed, that no load of the valve spring 74 is exerted against the thrust plug 98. This is of course the state and relation of parts in all forms of the invention. It is, in fact, the torque spring 102 which simply maintains the thrust plug 98 up against the lower end of valve stem 72. With this in mind, it is seen that the valve spring 74 does not load or press downwardly on any of the tappet mechanism, say its sleeve 76, the roller 79, or other parts thereof, except on the lobe 75 when the latter rides upwardly against the roller 79. At all other times, as when the tappet is normally traversing the heel 77, 78 of the cam, there exists absolutely no pressure or load on the tappet and cam heel as exerted from the valve spring 74. This condition obtains inasmuch as the constant no-clearance relation, between the plug 98 and valve stem, is incapable of transmitting the load of the valve spring 74 downwardly to the tappet parts and cam when the valve is on its seat 73.

Consider now that the valve stem 72 has elongated due to extreme heating conditions, as at the reference line Y in Figure 17. In this circumstance, it is clear that the compensator 98 yields and creeps downwardly and rewinds the torque spring 102, by the force of the spring loaded valve 72 and by impacts from said valve, at the instant the clutch means 89, 96 is relieved of pressure. The clutch 89, 96 releases when the cam roller 79 traverses the eccentric heel 78 of the cam. When the latter action takes place, it is clear that the compensator plug 98 may turn in either direction, moving down and contracting inwardly for valve stem elongation, as shown in Figure 17, and moving upwardly or out to adjust for valve stem cooling and shrinkage, as at the reference line X in Figure 18. Hence the no-clearance operating relation or contact is maintained throughout the several thousandths of an inch variation as indicated at XY, regardless of variation in length of parts in either direction, whether growing longer or shorter.

When the valve stem 72 elongates, the flange 90 more perceptibly bears on the rim 85 of the tappet sleeve 76 because the flange tends to reach the stop 85 before the valve 72 reaches its seat 73. Therefore, the load of the valve spring 74 is transmitted to the sleeve 76 and thence to the cam runs 77. The roller 79 now traverses the eccentric cam heel surface 78, but without actually dropping down on said eccentric portion 78, and the pressure is relieved from the clutch 89, 96. Next, the down force of the valve spring 74 slides the studs 100 downwardly along the inclined planes 91 until the valve 72 seats at 73, whereupon the compensating action ceases and the clutch 89, 96 again locks the self adjusting unit against movement as and before the roller 79 is approached by the lobe 75 of the cam.

It is to be understood that the drawings purposely show exaggerated operative positions for emphasis and clarity. For example the eccentric drop 78 on the heel of the cam is shown to be somewhat greater than necessary or in actual practice. The view also exaggerates the declutched position of the rotary clutch member 95 which is shown to be withdrawn from the stationary clutch cuff 88. As a matter of fact, in actual practice, no such relative separation of parts takes place. The clutch 95 does not withdraw from the cuff 88 but it is shown that way in this disclosure for clarity. Normally, the roller 79 and its carrier 82 are held up in the tappet sleeve 76 by the viscosity of the oil which generally lubricates all the tappet parts throughout. Likewise, it is understood that the high speed rotation of the cam shaft 71 affords very little time for the roller 79 to drop down and ride the eccentric heel portion 78 of the cam as in Figure 18. No matter whether the roller 79 actually runs in contact with the declutching eccentric heel portion 78 or not, the load and pressure, originating with the engine valve spring 74 and cam lobe 75, is assuredly released, with minimum motion between the parts, every time the cam heel 77, 78 traverses the roller 79. Hence the valve lifter is in a state of relaxation at that time but no actuation occurs in the clutch and compensating means unless the valve stem length has actually changed.

It is now seen how the self adjusting valve lifter rides the cam lobe 75 only under pressure, and that when the valve 72 reaches its seat 73, there is no additional down pressure on the valve lifter so that only the weight of the lifter mechanism itself rests on the cam run heels 77 during normal operation. This arrangement avoids wear, saves power and minimizes heating inasmuch as frictional engagement on the cam is considerably reduced.

The holding power of the clutch is very pronounced. The eccentricity of the bearing pin 99 affords a powerful clutching action to lock the compensator 98 within its guide member 88 against any type of spring 74 which may be used. Powerful springs are sometimes employed to adequately load high speed reciprocating poppet valves. This invention presents clutch means of amplified power stepped up to control delicate self adjusting mechanism designed to handle high powered valves.

*The sixth form in Figures 22 thru 26*

The sixth form of the invention is characterized by a wedge compensator and wedge clutch means. This form of valve lifter may be used in combination with a specially designed cam 11, 12 heretofore described and preferably so, or with a conventional cam having the plain concentric heel 112 and lobe 111 on a cam shaft 110. To show the comprehensiveness of the invention, the conventional cam 112 is shown in these views.

A valve and stem 108 is actuated by a tappet sleeve 109 confined in its bearing guide 107 and driven from the cam shaft 110. A valve spring 113 closes the valve on its seat 114 in the usual way. In this modification of the invention, the compensating unit is housed within the tappet sleeve 109 and positively maintains a no-clearance engagement or contact with the tail end of the valve stem 108. The valve spring 113 does not exert pressure on the tappet sleeve 109 except when the cam lobe 111 is opening the valve, as in Figure 24. A few thousandths of an inch clearance exists between the cam heel 112 and the surface of a cam follower 119 carried by sleeve 109, as later described. This clearance relation is shown on an enlarged scale in Figures 22 and 23 and is precisely set up by shim means when the valve operating mechanism is assembled.

The tappet sleeve 109 has a stop flange 105 adapted to come to rest on the top edge 106 of the bearing guide 107 in which the valve lifter reciprocates. In fact the reference character 106 points out a shim or shims, variable in thickness to thousandths of an inch, by which the top edge of the bearing guide is precisely located at exactly the correct height above the cam 112 and below the engine seat 114, whereby the stress or pressure exerted by elongation of the valve stem may be transferred to and exerted on the self adjusting unit to enforce automatic compensation, as will more fully appear.

The wedge type compensating unit and its coacting control clutch is outlined in Figure 26 where the component parts thereof are illustrated in separate aligned position in order of their assembly. The several parts are operatively housed in the sleeve 109 which has a transverse partition, seat, or rest flange 115 on which a simple form of wedge clutch slides perceptibly in effecting its take-up or compensating function. The seat 115 is made with a bearing hole 116 at the center of the tappet sleeve 109.

Referring further to Figure 26 for a structural discussion of the self adjusting unit and its control clutch, it is noted that a clutch and load carrying stem 117 projects axially from a guide 118 integrally formed with a cam follower head 119. The upper end of the stem 117 is finished in the form of a wedge 120 forming one element of a clutch. Another clutch member 121 has a flat lower face 122 and an upper bevelled wedging face 123. A clutch groove 124 is made in the lower face of the clutch member 121 as the counterpart of the wedge end 120. Thus the co-acting wedge faces 120 and 124 comprise a simple form of wedge clutch means having straight or plane faces as distinguished from the several types of clutches heretofore described. A plunger socket 125 is made just above the clutch groove 124 for the reception of a coil compression spring 126 followed by a plunger 127.

Another wedge 129 is provided with a valve stem head or seat 130 adapted to carry the load of the valve stem 108 and its closing spring 113 when the lobe 111 of the cam is opening the valve. Said clutch member 129 is made with a lower beveled face 131 adapted to rest on and slide in relation to the correspondingly bevelled surface 123 to urge the head 130 up and down in the sleeve 109 to follow or yield to the changing conditions and length of the valve stem to maintain the no-clearance relation therewith.

The foregoing described self adjusting unit and control clutch are assembled in the tappet sleeve 109 with the load carrying stem 117 longitudinally movably free within the bearing hole 116 of the seat 115. This places the cam follower 119 in operative relation with the engine driven cam 112 and the lower clutching wedge 120 projects into the upper part of the tappet sleeve 109. The upper and laterally movable clutch member 121 rests upon the sleeve seat 115 with its clutch groove 124 in engagement with the load carrying wedge clutch 120. The spring pressed plunger 127 bears against the inner wall of the sleeve 109 and the uppermost wedge 129 rests upon the laterally movable clutch device 121 with the engine valve 108 bearing upon the valve stem seat 130 of the self adjusting unit in the automatic tappet with no-clearance contact.

After assembling the parts above described, all lost motion is taken up between the sleeve seat 115 and valve stem 108 by expansive force exerted from the compression spring 126 which urges the compensating member 121 transversely to the right, as in Figure 22, thereby snugly setting up the two wedge parts 121 and 129 between said tappet seat 115 and the valve stem 108. At this stage of assembly, there exists no locking function by which to positively anchor the compensation unit 121, 129 in rigid and nonyielding position for lifting the spring loaded valve 108, but provision is made therefor, nevertheless. The clutch faces 120 and 124 are not inherently self locking wedge holding elements because the angle of the clutching faces is sufficiently steep or small to avoid self sticking. In other words, the mere weight of the cam follower 119 and its stem 117 is enough to disengage the clutch faces one from the other. This condition enables the spring and plunger means 126, 127 to maintain the active clutch member 121 snugly wedged between the tappet and valve stem for the desired no-clearance contact of all parts. It is significant that the angle of the cooperating wedge faces 123 and 131 is steep enough, in relation to the axis of the spring loaded valve 108, to permit a relatively self adjusting and sliding movement between the two members 121 and 129 to accomplish tappet contraction in event the valve 108 elongates and the load of the valve spring 113 is delivered thereagainst, provided, of course the clutch 120, 124 is disengaged.

In operation, the cam lobe 111 approaches the cam follower 119 and the first contact between these two elements positively sets up and fixes the clutch 120, 124 in rigid relation so that the downward force or load of valve spring 113 cannot possibly displace the self adjusting member 121 to the left despite the angular relation existing between the two parts 121 and 129. The cam lobe 111 continues upwardly to complete the opening and closing cycle of the valve. When the valve 108 reaches its seat 114, all the load of the spring 113 is then carried on the self adjusting seat 130 and the tappet sleeve 109 stops against the upper end of the bearing guide 107 which is necessarily shimmed up at 106 by which to precisely set the top edge for receptive contact with the flange stop 105 on the top end of the tappet sleeve 109.

The thickness of the shim 106 is precisely gaged to leave a few thousandths of an inch clearance between the cam heel 112 and follower 119 when the valve 108 is on its seat 114. This clearance factor is small and only sufficient to allow relief of pressure from the coacting clutch faces 120 and 124. When that relief takes place, the adjusting device 121 readily slides to the right to counteract for a shrinking valve stem, or to the left for an expanding valve stem. The compression spring 126 in the self adjusting unit acts to take up for a shrinking valve stem, while the engine valve spring 113 enforces contraction of the self adjusting unit 121, 129 for valve stem expansion. The coacting angular faces 123 and 131 strain on the clutch faces 120 and 124 when under load of the engine valve spring, but the attitude thereof is adequate to insure relative movement of the lower wedge 121 to the left when the clutch is free.

*General considerations common to all forms*

As a new principle in my several inventions herein disclosed, it is now seen that the several mechanisms, comprising the clutches and the self adjusting units, are at rest and remain inert or inactive so long as the length of valve operating parts is constant. The period or time factor for constant length operation is by far the longer period since variation in length of operating parts actually occurs over a relatively short time. By this is meant that an engine starts cold and attains its normal working temperature in a comparatively short time, say a few minutes or longer, whereas the engine may thereafter run for many hours or even days. During normal working period of the engine, my automatic valve lifter functions without self actuation and friction of parts. This avoids wear and distinguishes from prior devices, the mechanism of which is, generally, in a continuous state of operation when, in fact, no needful compensation is occurring because the valve stem long since attained its heated and normally expanded working length.

Likewise, the cooperation of the cam and tappet in my several inventions is one of special moment, in that I provide against riding the heels of the cams with pressure. The lobe of the cam is the only working and wearing part because there is a complete absence of springs or other load means to force the cam followers of my valve lifters to ride or follow the cam the entire 360° of operation and this condition saves power and avoids wear.

The minimum weight or mass of reciprocating parts is also mentioned because the invention seeks, among other things, to lighten the weight of parts. Especially is this true with certain forms of the invention where the tappet sleeve is comparatively free of operating parts.

I ascertained in the problems presented that the actual time or permissible period of self adjustment is a most important factor. If the clutch means or self adjusting elements should undergo relative movement on or between each other, while the valve is off its seat, it is clear that the pressure or load of the valve spring and pressure of the cam lobe would indeed rapidly wear out the mechanism. Furthermore loss in valve lift occurs. Either reason is found sufficient to require, in a successful device, that all clutching or self adjusting action be avoided just as or before the valve starts from its seat and until or after it returns. In my inventions, all clutch action and the performance of compensation between the responsive elements, starts and ends well within that period during which the valve is at rest on its seat. In fact, this new principle is so utilized that no actuation of the cooperating clutch means and self adjusting unit is permitted for a predetermined number of degrees of cam rotation or period of time before and after the cam lobe reaches and leaves the cam follower.

In the several forms of valve lifter construction, the self adjusting unit is easily placed in or removed from the tappet sleeve and protrudes from the upper end thereof just sufficiently to make assembly a simple matter, and the cam follower is carried at the other end of the sleeve or protrudes therefrom. The construction is durable and fills a want long felt for adequate no-clearance valve operating mechanism.

What is claimed is:

1. A self adjusting tappet adapted to cooperate with a valve comprising a sleeve having a cam follower, a compensating unit mounted in the sleeve and comprising a split nut embracing a screw, and spring means to actuate the compensating unit to maintain no-clearance engagement with a valve.

2. A self adjusting valve tappet comprising a sleeve having a cam follower, a compensating unit mounted in the sleeve and including a clutching nut means embracing a screw, and a torque spring one end of which is attached to the clutching nut means and the other end attached to the screw.

3. A self adjusting valve tappet comprising a sleeve having a cam follower at one end and open at its other end, a compensating unit removably mounted in the open end of the sleeve and having a large flange portion which overhangs the end of the sleeve and a reduced portion which fits down into the sleeve, said unit including a clutching nut on which the flange portion is formed, a compensator screw which is threaded into the clutching nut, and a torque spring having its ends anchored to the screw and nut to impart relative movement thereto.

4. A self adjusting valve tappet comprising a sleeve having a cam follower at one end and open at its other end, a compensating unit removably mounted in the open end of the sleeve and have a large flange portion which overhangs the end of the sleeve and a reduced portion which fits down into the sleeve, said unit including a clutching nut on which the flange portion is formed, a compensator screw which is threaded into the clutching nut, a torque spring having its ends anchored to the screw and nut to impart relative movement thereto, said clutching nut being split longitudinally and adapted to contract and expand to pinch and release the compensator screw, and clutch actuating means included in the sleeve and nut by which pressure is applied to and removed from the clutching nut to contract and expand it in relation to the screw.

5. A self adjusting valve tappet comprising a sleeve having a cam follower at one end and open at its other end, an internally threaded member including a cylindrical portion fitted into the open end of the sleeve, a flange integral with the member and overhanging the open end of the sleeve, a compensator screw mounted in the threaded member, a torque spring having its ends anchored to the member and screw; and means included in the member, cooperating with the sleeve, and responsive to the sleeve and cam follower, to control the action of the screw and torque spring by pinching or releasing the member in relation to the screw.

6. A self adjusting valve tappet comprising a sleeve of light weight formation closed at one end to form a cam follower and open at its other end, a compensating unit supported in the open end of the sleeve and projecting part way thereinto which leaves said sleeve empty at its cam follower end, the compensating unit having a diverging external surface which rests against the open end of the sleeve to support said unit at one end of the sleeve, and means included in the compensating unit and responsive to pressure engagement and relief thereof between the diverging surface and open end of the sleeve to effect the adjusting of said unit.

7. A self adjusting valve tappet comprising a sleeve of light weight formation closed at one end to form a cam follower and open at its other end, an internally threaded member having an external cylindrical taper reducing in size toward the closed end of the sleeve, said member being supported by the open end of the sleeve, a compensator screw carried by the member and projecting from each end thereof, a torque spring having its ends anchored to the member and screw, the sleeve being light weight in construction and the screw and member occupying one end thereof only; and means affording a clutching action of the internally threaded member, whereby pressure transmitted thereto from the sleeve engaging the member causes the latter to pinch and lock the screw against rotation.

8. A self adjusting valve tappet comprising a sleeve closed at one end and having an internally cone-shaped mouth at its other end, a nut having an externally cone-shaped surface which engages the sleeve mouth and supports the nut at the end of said sleeve leaving the sleeve empty for lightness, a screw rotatably mounted in the nut, said nut being divided longitudinally and adapted to contract about the screw and lock the latter against rotation when the cone-shaped mouth and surface are pressed together, and torque means reacting between the nut and screw to urge one in relation to the other.

9. A self adjusting valve tappet comprising a sleeve having a cam follower, a compensating unit mounted in the sleeve and including a clutching nut means embracing a screw, a torque spring one end of which is attached to the clutching nut means and the other end attached to the screw; and supporting means, correlated with the sleeve and compensating unit, acting to removably mount said compensating unit in one end of said sleeve, whereby the other end of the sleeve is left empty.

10. A self adjusting valve tappet comprising a sleeve, a split clutching nut mounted in one end of the sleeve, a screw rotatably confined in the nut, said nut and sleeve having pressure engaging surface means which contracts the nut around the screw and locks the latter when said nut and sleeve are set tightly together, and spring means interconnected between the screw and nut.

11. A self adjusting valve tappet comprising a sleeve, a split clutching nut mounted in one end of the sleeve, a screw rotatably confined in the nut, said nut and sleeve having complementary engaging wedging surfaces which taper inwardly toward the other end of the sleeve and react to pinch the split clutching nut against the screw, and a coil spring surrounding and anchored to the screw and to the nut to urge one in relation to the other when the split nut is released from the screw.

12. A self adjusting valve tappet comprising a sleeve at one end of which is formed a cone-shaped mouth the apex of which is disposed toward the other end of the sleeve, a split nut having an internally threaded bore and a compensator screw mounted therein, said nut having a cone-shaped exterior resting in the sleeve mouth, an unthreaded shank on the screw projecting from the split nut into the sleeve, and a torque spring coiled about the shank and having one end fixed thereto with its other end fixed to the split nut.

13. A self adjusting valve tappet comprising a sleeve having an open end defined by a bevelled rim of gradually decreasing diameter leading into the sleeve, a clutching nut in the form of a cylindrical member mounted in the open end of the sleeve, a screw rotatably mounted in the nut, a flange formed on the outer end of the nut member and overhanging the sleeve, a cone-shaped exterior surface on the nut member extending from the flange into the sleeve and engaging the bevelled rim of the sleeve, a cylindrical cuff integral with the nut member and extending from the cone-shaped surface into the sleeve beyond the bevelled rim; said clutching nut member being split lengthwise through its flange, the cone-shaped surface, and through the cuff thereof to afford contraction and expansion to clutch the screw; and a coil spring mounted axially within the sleeve with one end thereof anchored to the cuff and the other end attached to the screw.

14. A self adjusting valve tappet, comprising a sleeve adapted to reciprocate in an open bearing guide, said sleeve having an open end formed with a cone-shaped mouth adapted to drop below the open end of said bearing guide, an internally threaded member, a screw rotatably carried in the member, means cooperating with the member forming a clutch thereof to lock the screw against rotation, a spring having one end thereof fixed to the member and its other end fixed to the screw, said member being seated in the cone-shaped mouth of the sleeve, and a flange formed on the member adapted to coact with the bearing guide to receive the compensating unit and afford an easing away of the sleeve from the clutching means.

15. A self adjusting valve tappet, comprising a sleeve adapted to reciprocate in an open bearing guide, said sleeve having an open end formed with a cone-shaped mouth adapted to drop below the open end of said bearing guide, a screw mounted in a clutching means with a torque spring having one end attached to said clutching means and the other end of said spring attached to the screw thus forming a compensating unit, a flange formed on the clutching means and said flange being larger in diameter than the bearing guide and sleeve, said compensating unit being mounted in the cone-shaped mouth with the flange adapted to stop against the bearing guide to arrest the travel of the compensating unit whereby the sleeve may ease away from the compensating unit.

16. A self adjusting valve tappet adapted to operate in a bearing guide, and adapted to actuate a spring loaded valve in relation to its seat; comprising a cam follower projecting from one end of said guide, a split clutching means mounted on the cam follower and carrying a compensating screw projecting from the other end of said bearing guide and adapted to cooperate with a spring loaded valve to carry the load thereof, a stop flange integral with the split clutching means and adapted to come to rest on the end of the bearing guide to transfer the load of the valve from the split clutching means to said bearing guide, and a tensioned force applying means carried by the split clutching means and the screw to urge movement of one in relation to the other when said load of the valve is resting on the bearing guide.

17. A self adjusting tappet adapted to reciprocate in a bearing guide, and adapted to operate a spring loaded valve and stem in relation to its seat; comprising a sleeve having a cam follower at one end and an internal conical edge opening at the other end; a member having a conical exterior which rests in the conical opening of the sleeve, and the load of the valve, when off its seat, being carried by the sleeve's conical edge opening; a flange on the member adjoining the conical exterior thereof and said flange being larger than a bearing guide in which the sleeve is adapted to reciprocate, clutching means associated with the member, a screw mounted in the sleeve and adapted to carry the load of the valve off its seat and cooperating with the member and clutching means and normally locked therein; said flange being adapted to come to rest on the end of the bearing guide, in event the valve stem elongates, whereupon the load of the valve shifts from the sleeve to said bearing guide, to relieve the load at the conical edge opening of the sleeve; and a spring, under initial tension, attached to the screw and the member, and adapted to wind up and further tension itself under the inwardly turning action of the screw propelled into the sleeve by the load of the valve when said flange came to rest aforesaid on the bearing guide; said spring acting reversely to turn the screw outwardly from the sleeve to follow a receding or contracting valve stem when the flange does not reach the bearing guide; whereupon, during normal valve stem length conditions, the valve reaches its seat precisely simultaneously as the flange comes to rest on the end of the bearing guide, under these two normal operating conditions of which no relative self adjusting movement or automatic action takes place in or between the parts of the tappet.

18. An automatic compensating valve lifter comprising a tappet sleeve open at one end, said open end of the sleeve having a circular formed tapering edge reducing in size inwardly of the sleeve; an internally threaded member seated on the tapering edge, and clutch means correlated with the member; a screw mounted in the member, one end of which projects into the sleeve, and the other end being adapted to engage a valve stem with no-clearance engagement; and a torque spring in the sleeve having one end fixed to the member and the other end fixed to the screw to turn the latter in relation to the member.

19. An automatic compensating valve lifter comprising a tappet sleeve open at one end clutch means mounted in the open sleeve end, coacting wedging surfaces cooperating with the clutch means and sleeve by which the sleeve actuates said clutch means; a rotatable member cooperating with the clutch means, means to move said member longitudinally within the clutch means; a head formed on the outer end of the rotatable member adapted to engage a valve stem, said head forming a stop to limit the longitudinal movement of said rotatable member in one direction; and torque spring means in the sleeve to actuate said rotatable member, and acting as a stop to limit the longitudinal movement of said member in the other direction.

20. An automatic compensating valve lifter comprising a tappet sleeve, a clutching nut split longitudinally and mounted in one end of the sleeve, a screw mounted in the nut; engaging tapered surface means between the clutching nut and sleeve, whereby pressure of the sleeve against the nut acts to clutch the latter about the screw; a torque spring mounted axially within the sleeve, under and adjacent the nut, having one end thereof fixed to the nut, the other end of said spring being fixed to the screw to urge the latter outwardly, and said spring acting as a stop to limit the outward travel of the screw in relation to the nut; and a stop head on the outer end of the screw to limit the inward travel thereof.

21. An automatic compensating valve lifter comprising a tappet sleeve having a cam follower at one end and open at its other end, a self adjusting unit mounted in the open end of the sleeve and comprising a nut split longitudinally; a screw carried in the nut and having a limited rotative adjustment in both directions and projecting from each end of said nut, a head on the screw located outside the sleeve adjacent the nut and against which a valve is adapted to rest, an unthreaded shank formed on the screw inside the sleeve; and a torque spring inside the sleeve adjacent the nut, one end of which is secured to the nut and the other end to the shank.

22. An automatic compensating valve lifter comprising a tappet sleeve having an inwardly tapering end; a member including internal screw threads, an external tapered surface which is seated in the end of the sleeve, a cylindrical cuff adjoining the tapered surface and extending into the sleeve beyond its inwardly tapering end, said member being split longitudinally from its outer surface thru the screw threads and axially thereof, and thus producing a two-piece contractible clutching nut; a compensating screw carried by the two-piece clutching nut and projecting from each end of said nut, a head formed on the outer end of the screw closely adjacent the nut, and a torque spring wound around and attached to the screw closely adjacent the nut and fixed to one piece of said nut to urge the screw outwardly from the sleeve.

23. An automatic compensating valve lifter comprising a tappet sleeve closed at one end forming a cam follower and open at its other end with an inwardly reducing taper, a clutching nut consisting of a plurality of segments having external reducing taper surfaces seated in the open sleeve end, a screw mounted in the segmental clutching nut and locked against rotation by pressure of the sleeve against the taper surfaces and releasable for rotation by removing said pressure, and a torque spring having one end fixed to one segment and its other end fixed to the screw.

24. An automatic compensating valve lifter adapted to reciprocate in a bearing guide to actuate a spring loaded valve and stem in relation to the seat of the valve; comprising a tappet sleeve closed at one end by a cam follower, and open at its other end with an inwardly formed tapered seat, said sleeve being adapted to sustain the load of the valve when off its seat; a plurality of internally threaded segmental members having external tapered surfaces mounted within the tapered seat to provide a clutching nut supported at the end of the sleeve in spaced relation from the cam follower; a stop flange on the outer end of the segmental members adapted to come to rest on the bearing guide to transfer the load of the valve to the bearing guide and relieve the sleeve of said load whereby the engaged tapered surfaces are not under pressure; a screw made slightly longer than the nut and adapted to bear against a valve stem and having a head on one end and a smooth shank on the other end, said screw being mounted in the segmental clutching nut with its ends projecting from the nut, a torsion spring coiled about the shank of the screw with one end of the spring fixed to one segment and the other end fixed to the extremity of the shank.

25. An automatic compensating valve lifter comprising a tappet sleeve having an inwardly tapered open end, a clutching nut having an external taper forming the counterpart of the open sleeve end and seated in the latter, said clutching nut formed with a single split made lengthwise from its external taper into one side of the internal screw threads provided in said nut, thereby providing a one-piece nut having elasticity to contract and expand by opening and closing the lengthwise split, a screw mounted in the one-piece nut and its relative rotative adjustment therein being controlled by the clutching action of said nut, and a torque spring having one end fixed to the nut and the other end fixed to the screw.

26. Valve operating mechanism comprising in combination, a valve adapted to be actuated in relation to its seat, a bearing guide, a tappet sleeve in the bearing guide, cam means including a lobe and having a concentric heel and an eccentric heel, compensating means mounted in one end of the tappet sleeve in no-clearance engagement with the valve stem, and a cam follower cooperating with the compensating means and mounted in the other end of the tappet sleeve and adapted to ride the lobe to actuate the valve thru said compensating means, the tappet sleeve being adapted to traverse the concentric heel of the cam while the valve is on its seat, said cam follower having a limited movement within and relatively to the tappet sleeve and adapted to traverse the eccentric heel of the cam to effect operation of the compensating means while the tappet sleeve is traversing the concentric heel.

27. Valve operating mechanism comprising in combination, a valve adapted to be actuated in relation to its seat, a bearing guide, a tappet sleeve in the bearing guide; cam means including a lobe, a pair of spaced concentric heel runs, and a central eccentric heel run; compensating means having a clutch to control same mounted in one end of the sleeve and the valve resting against the compensating means, a cam follower roller and means mounted in the sleeve to carry the roller at the other end of said sleeve and to transmit a thrust from the cam to the clutch to engage the latter preliminary to the lobe reaching the roller to open the valve, said sleeve being adapted to traverse the spaced concentric heel runs when the roller traverses the central eccentric heel run whereby the clutch is disengaged to effect compensation while the valve is seated.

28. Valve operating mechanism comprising in combination, a spring loaded valve adapted to be actuated in relation to its seat, a bearing guide and a tappet sleeve adapted to reciprocate therein, a stationary member carried in one end of the sleeve, said member having a longitudinal bore and an inclined spiral face, a thrust plug rotatably mounted in the longitudinal bore and having a load carrying means to ride the spiral face, the valve resting against the thrust plug, a torque spring interconnected between the stationary member and the thrust plug to impart a rotative adjusting movement to the thrust plug to maintain it against the valve, a clutch cooperating with the thrust plug to hold the latter against rotative movement, a cam follower carried in the sleeve and cooperating with the clutch to engage the latter to lock the thrust plug against rotation; and cam means having a lobe which rides the cam follower aforesaid, an eccentric heel on the cam means which traverses the cam follower to release the clutch, and spaced concentric heels which traverse the end of the tappet sleeve and support the stationary member and thrust plug as the cam follower releases the clutch by traversing the eccentric heel.

29. Valve operating mechanism comprising in combination, a cam including a lobe and a heel having spaced concentric runs and a central eccentric run, a bearing guide, a tappet sleeve adapted to reciprocate therein and having its end adjacent the cam cut away at the central eccentric run and formed on a radius to traverse the spaced concentric runs, a roller mounted in the cut away end of the sleeve to traverse the central eccentric run, self adjusting means mounted in the other end of the sleeve, a valve resting against the self adjusting means and adapted to be actuated in relation to a seat provided therefor, a clutch in the tappet sleeve to control the self adjusting means, a carrier mounted in the tappet sleeve for limited relative movement therein and one end of said carrier cooperating with the clutch, said roller being journaled in the other end of the carrier and acting to engage the clutch when the lobe rides against said roller and acting to relieve the clutch of engaging pressure when said roller traverses the eccentric run, and said tappet sleeve traversing the concentric run to receive the load of the valve when on its seat in aid of relieving the clutch of pressure engagement aforesaid in event the valve stem has elongated.

30. An automatic compensating valve lifter comprising a sleeve open at both ends and adapted to reciprocate in a bearing guide, a cylindrical body mounted for limited relative sliding movement within the sleeve and having a cam follower protruding from one end of said sleeve adapted to engage a cam and lift a valve off its seat, self adjusting mechanism mounted in and protruding from the other end of the sleeve and adapted to engage the valve, and said self-adjusting mechanism including clutch means disposed adjacent and operated by the cylindrical body to release said clutch only when the valve is on its seat.

31. An automatic compensating valve lifter comprising a sleeve open at both ends, a roller mounted at one end of the sleeve, a cylindrical carrier in which the roller is journaled, said carrier being shorter than and slidably mounted in the sleeve, and self adjusting mechanism mounted in the other end of the sleeve and engaging the cylindrical carrier; said mechanism being locked against adjustment when the roller and its carrier are urged toward said mechanism to apply pressure thereto and unlocked for automatic adjustment when the roller and its carrier release said pressure.

32. An automatic compensating valve lifter comprising a roller carrier having a fork formation at one end and a roller journaled in the fork, self adjusting mechanism including a clutch resting on the other end of the carrier, and a sleeve mounted over and having limited free movement on the carrier and self adjusting mechanism.

33. An automatic compensating valve lifter comprising a roller carrier having a fork formation at one end and a roller journaled in the fork, self adjusting mechanism including a clutch resting on the other end of the carrier, a sleeve mounted over and having limited free movement on the carrier and self adjusting mechanism, that end of said sleeve which is adjacent the roller being cut away to form a furcated end in which said roller turns, and a stop means included with the self adjusting mechanism adapted to come to rest on the other end of the sleeve in aid of releasing the clutch.

34. An automatic compensating valve lifter comprising a sleeve open at both ends, a cam follower carried in one end of the sleeve and having limited relative movement therewith, a clutch mounted proximate the other end of the sleeve, a thrust member operatively connected with the clutch and mounted in the sleeve and adapted to engage a valve, means for rotatively urging the thrust member longitudinally in relation to the sleeve; and an operating connection between the clutch and cam follower, whereby the latter engages and locks the clutch when riding the lobe of a cam, and disengages and unlocks the clutch when traversing the heel of a cam.

35. An automatic compensating valve lifter comprising a sleeve open at its top and bottom ends, a cam follower mounted in the lower end of the sleeve for limited longitudinal movement therein, a stationary cuff member mounted in the sleeve and having a flange resting on the upper end of the sleeve, a rotating compensator mounted in the cuff member and means to impart longitudinal movement thereto in relation to said cuff member, a torque spring having its ends fixed to the compensator and to the cuff member, and a clutch operatively connected with the compensator and coacting with the cam follower to control the rotative adjustment of the said compensator.

36. An automatic compensating valve lifter comprising a sleeve open at its top and bottom ends, a cam follower mounted in the lower end of the sleeve for limited longitudinal movement therein, a stationary cuff member mounted in the sleeve and having a flange resting on the upper end of the sleeve, a rotating compensator mounted in the cuff member and means to impart longitudinal movement thereto in relation to said cuff member, a torque spring having its ends fixed to the compensator and to the cuff member, a clutch disc mounted between the cuff member and cam follower, coacting cone-shaped faces formed between said clutch disc and cam follower, and an operating connection between the clutch disc and compensator.

37. An automatic compensating valve lifter comprising a sleeve open at its top and bottom ends, a cam follower mounted in the lower end of the sleeve for limited longitudinal movement therein, a stationary cuff member mounted in the sleeve and having a flange resting on the upper end of the sleeve, a rotating compensator mounted in the cuff member and means to impart longitudinal movement thereto in relation to said cuff member, a torque spring having its ends fixed to the compensator and to the cuff member, a clutch disc mounted between the cuff member and cam follower, coacting cone-shaped faces formed between said clutch disc and cam follower, a bearing pin carried on the lower end of the compensator and off center from the axis thereof, said clutch disc having a bearing hole therethru and also off center from its axis, and the bearing pin being mounted in the bearing hole for rotary and longitudinal movement therein.

38. An automatic compensating valve lifter comprising a sleeve open at both ends, clutch means mounted in the sleeve and including coacting cone-faced members, an adjusting device constituting a seat for the tail of a valve stem and means mounting it for rotative and longitudinal movement in one of the cone-faced members, pin and bearing means operatively connecting the adjusting device with one of the cone-faced members, and a torque spring interconnected between the adjusting device and the other cone-faced member.

39. An automatic compensating valve lifter comprising a sleeve open at both ends, clutch means mounted in the sleeve and including coacting cone-faced members, an adjusting device constituting a seat for the tail of a valve stem and means mounting it for rotative and longitudinal movement in one of the cone-faced members, a bearing pin carried at the inner end of the adjusting device and off center from the axis thereof, a bearing hole provided in the other cone-faced member and also off center from the axis thereof, said bearing pin operatively fitted into said bearing hole for combined rotative and longitudinal movement in relation to each other, and a torque spring wound around the adjusting device with one end fixed to said device and the other end thereof fixed to that cone-faced member in which said device is mounted.

40. An automatic compensating valve lifter comprising a tappet sleeve open at both ends, a clutch sleeve mounted in one end of the tappet sleeve, a flange on one end of the clutch sleeve which rests on the end of the tappet sleeve, a cone face on the other end of the clutch sleeve, said flange having an inclined spiral face, a plug rotatively mounted in the clutch sleeve, load carrying stud means carried by the plug and bearing on the inclined spiral face, a torque spring wound around the plug and having one end thereof fixed to said plug and the other spring end fixed to the clutch sleeve, a clutch disc mounted in the tappet sleeve and having a cone face which coacts with the clutch sleeve, a pin and bearing means off center in respect to the clutch sleeve and operatively connecting the plug and clutch disc, and a cam follower carried in the tappet sleeve and cooperating with the clutch disc to press the latter against the clutch sleeve to lock the plug against rotation in the clutch sleeve.

41. Valve operating mechanism comprising in combination, a cam having a base circle eccentric to its axis of rotation, a valve and a spring to urge said valve to its seat, a self-adjusting valve lifter interposed between the cam and valve including a clutching device, an adjusting part carried within the clutching device, a spring positioned between the clutching device and the adjusting part, a member adapted to be reciprocated by the cam, said member and said clutching device having cooperating bevelled engaging surfaces which force the clutching device to lock the adjusting part therein when said member and clutching device are forced together, a stop against which the clutching device comes to rest when the valve is seated, the movement of the eccentric base circle of the cam along the member acting to allow the latter to release its pressure engagement from the clutching device, whereby the adjusting part moves in the clutching device to effect self-adjustment only when a variation in length occurs in the mechanism, and the load of the first-named spring is carried by the stop so that the member cannot ride the base circle of the cam under the force of said spring.

42. Valve operating mechanism comprising in combination, a cam having a base circle eccentric to its axis of rotation, a valve and a spring to urge said valve to its seat, a self-adjusting valve lifter interposed between the cam and valve including a split clutching nut, an adjusting screw carried within the nut, a torque spring interconnected between the split nut and screw, a member adapted to be reciprocated by the cam, said member and said clutching nut having cooperating conically engaging surfaces which force the nut to clutch and lock the screw therein when said member and nut are forced together, a stop against which the clutching nut comes to rest when the valve is seated, the movement of the eccentric base circle of the cam along the member acting to allow the latter to release its pressure engagement from the clutching nut, whereby the screw turns in the nut to effect self-adjustment only when a variation in length occurs in the mechanism, and the load of the first-named spring is carried by the stop so that the member does not ride the base circle of the cam under the force of said spring.

ROBERT C. RUSSELL.